US011159820B2

(12) United States Patent
Esenlik et al.

(10) Patent No.: US 11,159,820 B2
(45) Date of Patent: Oct. 26, 2021

(54) MOTION VECTOR REFINEMENT OF A MOTION VECTOR POINTING TO A FRACTIONAL SAMPLE POSITION

(71) Applicant: Huawei Technologies Co., Ltd., Shenzhen (CN)

(72) Inventors: Semih Esenlik, Munich (DE); Zhijie Zhao, Munich (DE); Han Gao, Munich (DE); Anand Meher Kotra, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/843,707

(22) Filed: Apr. 8, 2020

(65) Prior Publication Data

US 2020/0236398 A1   Jul. 23, 2020

Related U.S. Application Data

(63) Continuation of application No. PCT/EP2017/075714, filed on Oct. 9, 2017.

(51) Int. Cl.
*H04N 19/57* (2014.01)
*H04N 19/52* (2014.01)
(Continued)

(52) U.S. Cl.
CPC ............ *H04N 19/57* (2014.11); *H04N 19/52* (2014.11); *H04N 19/533* (2014.11); *H04N 19/56* (2014.11); *H04N 19/573* (2014.11)

(58) Field of Classification Search
CPC ...... H04N 19/57; H04N 19/52; H04N 19/533; H04N 19/56; H04N 19/573; H04N 19/513
(Continued)

(56) References Cited

U.S. PATENT DOCUMENTS

2003/0194010 A1 * 10/2003 Mukerjee ............ H04N 19/523
375/240.16
2013/0208799 A1 * 8/2013 Srinivasamurthy .... H04N 19/52
375/240.16
(Continued)

FOREIGN PATENT DOCUMENTS

CN        101686393 A      3/2010
CN        102263951 A     11/2011
(Continued)

OTHER PUBLICATIONS

Chen et al., "Algorithm Description of Joint Exploration Test Model 7 (JEM7)," Joint Video Exploration Team (JVET) of ITU-T SG 16 WP 3 and ISO/IEC JTC 1/SC 29/WG 11, 7th Meeting: Torino, IT, JVET-G1001-v1, XP030150980, total 48 pages (Jul. 13-21, 2017).
(Continued)

*Primary Examiner* — Susan E. Hodges
(74) *Attorney, Agent, or Firm* — Leydig, Voit & Mayer, Ltd.

(57) ABSTRACT

A motion vector determination employs template matching. At first, an initial motion vector is obtained. If the initial motion vector points to a position that is fractional, and thus, requires interpolation from the integer sample positions, the initial motion vector is rounded to a closest integer sample position. The rounded position is then used to define the search space for the template matching to define a refinement of the initial motion vector.

18 Claims, 17 Drawing Sheets

(51) Int. Cl.
*H04N 19/56* (2014.01)
*H04N 19/533* (2014.01)
*H04N 19/573* (2014.01)

(58) Field of Classification Search
USPC .................................................... 375/240
See application file for complete search history.

(56) References Cited

U.S. PATENT DOCUMENTS

| | | | |
|---|---|---|---|
| 2013/0272410 A1* | 10/2013 | Seregin | H04N 19/176 375/240.16 |
| 2014/0140405 A1* | 5/2014 | Seregin | H04N 19/20 375/240.15 |
| 2016/0286230 A1 | 9/2016 | Li et al. | |
| 2016/0323599 A1 | 11/2016 | Lu et al. | |
| 2018/0241998 A1* | 8/2018 | Chen | H04N 19/51 |

FOREIGN PATENT DOCUMENTS

| | | |
|---|---|---|
| CN | 103974077 A | 8/2014 |
| WO | 2017036414 A1 | 3/2017 |

OTHER PUBLICATIONS

Chiu et al., "TE1: Fast techniques to improve self derivation of motion estimation," Joint Collaborative Team on Video Coding (JCT-VC) of ITU-T SG16 WP3 and ISO/IEC JTC1/SC29/WG11, 2nd Meeting: Geneva, CH, JCTVC-B047, XP030007627, pp. 1-9 (Jul. 21-28, 2010).

Chiu et al., "Decoder-side Motion Estimation and Wiener filter for HEVC," 2013 Visual Communications and Image Processing (VCIP), XP032543658, total 6 pages, Institute of Electrical and Electronics Engineers, New York, New York (Nov. 2013).

Kamp et al., "Decoder-Side Motion Vector Derivation for Block-Based Video Coding," IEEE Transactions on Circuits and Systems for Video Technology, vol. 22, No. 12, XP011487149, pp. 1732-1745, Institute of Electrical and Electronics Engineers, New York, New York (Dec. 2012).

Li et al., "Rate-Distortion Criterion Based Picture Padding for Arbitrary Resolution Video Coding Using H.264/MPEG-4 AVC," IEEE Transactions on Circuits and Systems for Video Technology, vol. 20, No. 9, XP011315559, pp. 1233-1241, Institute of Electrical and Electronics Engineers, New York, New York (Sep. 2010).

Chen et al., "Decoder-Side Motion Vector Refinement Based on Bilateral Template Matching," Joint Video Exploration Team (JVET) of ITU-T SG 16 WP 3 and ISO/IEC JTC 1/SC 29/WG 11, 4th Meeting: Chengdu, CN, JVET-D0029, total 4 pages (Oct. 15-21, 2016).

Chen et al., "Algorithm Description of Joint Exploration Test Model 1," Joint Video Exploration Team (JVET) of ITU-T SG 16 WP 3 and ISO/IEC JTC 1/SC 29/WG 11, 1st Meeting: Geneva, CH, JVET-A1001, total 27 pages, (Oct. 19-21, 2015).

Bross et al., "Chapter 5 Inter-Picture Prediction in HEVC," High Efficiency Video Coding (HEVC): Algorithms and Architectures, pp. 113-140, Springer International Publishing, Switzerland (2014).

* cited by examiner

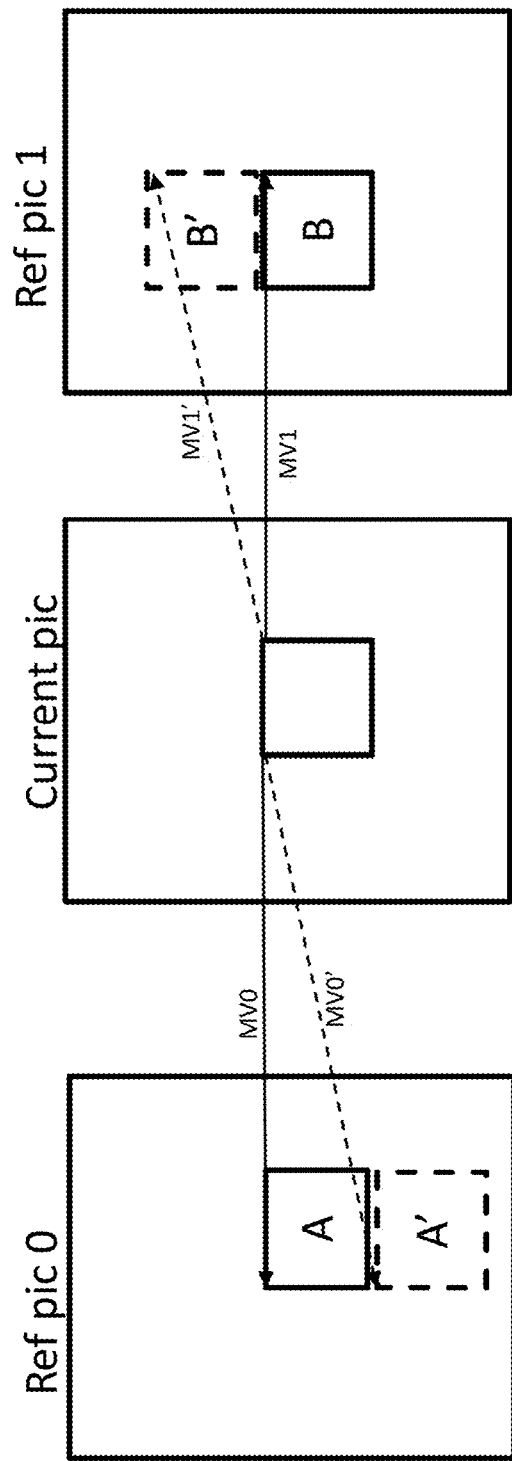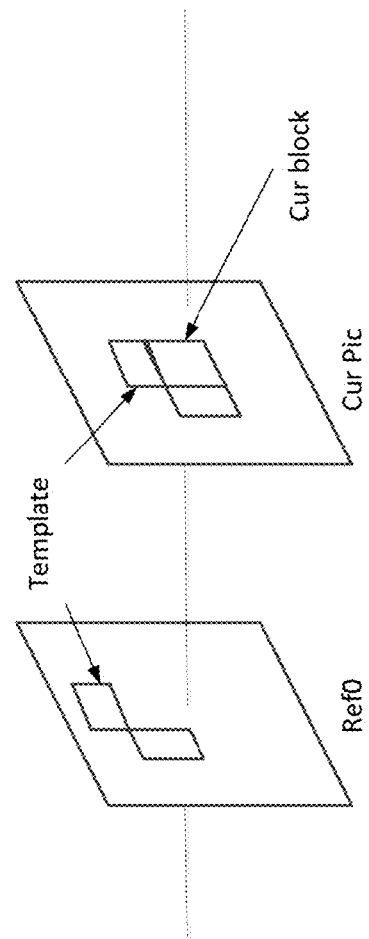
Fig. 3
Fig. 4

MOTION VECTOR REFINEMENT OF A MOTION VECTOR POINTING TO A FRACTIONAL SAMPLE POSITION

CROSS REFERENCE TO RELATED APPLICATIONS

This application is a continuation of International Application No. PCT/EP2017/075714, filed on Oct. 9, 2017. The aforementioned application is hereby incorporated by reference in its entirety.

TECHNICAL FIELD

The present disclosure relates to motion vector determination and refinement which may be employed during encoding and decoding of videos.

BACKGROUND

Current hybrid video codecs employ predictive coding. A picture of a video sequence is subdivided into blocks of pixels and these blocks are then coded. Instead of coding a block pixel by pixel, the entire block is predicted using already encoded pixels in the spatial or temporal proximity of the block. The encoder further processes only the differences between the block and its prediction. The further processing typically includes a transformation of the block pixels into coefficients in a transformation domain. The coefficients may then be further compressed by means of quantization and further compacted by entropy coding to form a bitstream. The bitstream further includes any signaling information, which enables the decoder to decode the encoded video. For instance, the signaling may include settings concerning the encoder settings such as size of the input picture, frame rate, quantization step indication, prediction applied to the blocks of the pictures, or the like.

Temporal prediction exploits temporal correlation between pictures, also referred to as frames, of a video. The temporal prediction is also called inter-prediction, as it is a prediction using the dependencies between (inter) different video frames. Accordingly, a block being encoded, also referred to as a current block, is predicted from one or more previously encoded picture(s) referred to as a reference picture(s). A reference picture is not necessarily a picture preceding the current picture in which the current block is located in the displaying order of the video sequence. The encoder may encode the pictures in a coding order different from the displaying order. As a prediction of the current block, a co-located block in a reference picture may be determined. The co-located block is a block which is located in the reference picture on the same position as is the current block in the current picture. Such prediction is accurate for motionless picture regions, i.e. picture regions without movement from one picture to another.

In order to obtain a predictor which takes into account the movement, i.e. a motion compensated predictor, motion estimation is typically employed when determining the prediction of the current block. Accordingly, the current block is predicted by a block in the reference picture, which is located in a distance given by a motion vector from the position of the co-located block. In order to enable a decoder to determine the same prediction of the current block, the motion vector may be signaled in the bitstream. In order to further reduce the signaling overhead caused by signaling the motion vector for each of the blocks, the motion vector itself may be estimated. The motion vector estimation may be performed based on the motion vectors of the neighboring blocks in spatial and/or temporal domain.

The prediction of the current block may be computed using one reference picture or by weighting predictions obtained from two or more reference pictures. The reference picture may be an adjacent picture, i.e. a picture immediately preceding and/or the picture immediately following the current picture in the display order since adjacent pictures are most likely to be similar to the current picture. However, in general, the reference picture may be also any other picture preceding or following the current picture in the displaying order and preceding the current picture in the bitstream (decoding order). This may provide advantages for instance in case of occlusions and/or non-linear movement in the video content. The reference picture identification may thus be also signaled in the bitstream.

A special mode of the inter-prediction is a so-called bi-prediction in which two reference pictures are used in generating the prediction of the current block. In particular, two predictions determined in the respective two reference pictures are combined into a prediction signal of the current block. The bi-prediction may result in a more accurate prediction of the current block than the uni-prediction, i.e. prediction only using a single reference picture. The more accurate prediction leads to smaller differences between the pixels of the current block and the prediction (referred to also as "residuals"), which may be encoded more efficiently, i.e. compressed to a shorter bitstream. In general, more than two reference pictures may be used to find respective more than two reference blocks to predict the current block, i.e. a multi-reference inter prediction can be applied. The term multi-reference prediction thus includes bi-prediction as well as predictions using more than two reference pictures.

In order to provide more accurate motion estimation, the resolution of the reference picture may be enhanced by interpolating samples between pixels. Fractional pixel interpolation can be performed by weighted averaging of the closest pixels. In case of half-pixel resolution, for instance a bilinear interpolation is typically used. Other fractional pixels are calculated as an average of the closest pixels weighted by the inverse of the distance between the respective closest pixels to the pixel being predicted.

The motion vector estimation is a computationally complex task in which a similarity is calculated between the current block and the corresponding prediction blocks pointed to by candidate motion vectors in the reference picture. Typically, the search region includes M×M samples of the image and each of the sample position of the M×M candidate positions is tested. The test includes calculation of a similarity measure between the N×N reference block C and a block R, located at the tested candidate position of the search region. For its simplicity, the sum of absolute differences (SAD) is a measure frequently used for this purpose and given by:

$$SAD(x, y) = \sum_{i=0}^{N-1} \sum_{j=0}^{N-1} |R_{i,j}(x, y) - C_{i,j}|$$

In the above formula, x and y define the candidate position within the search region, while indices i and j denote samples within the reference block C and candidate block R. The candidate position is often referred to as block displacement or offset, which reflects the representation of the block matching as shifting of the reference block within the search region and calculating a similarity between the reference block C and the overlapped portion of the search region. In order to reduce the complexity, the number of candidate motion vectors is usually reduced by limiting the candidate motion vectors to a certain search space. The search space may be, for instance, defined by a number and/or positions of pixels surrounding the position in the reference picture corresponding to the position of the current block in the current image. After calculating SAD for all M×M candidate positions x and y, the best matching block R is the block on the position resulting in the lowest SAD, corresponding to the largest similarity with reference block C. On the other hand, the candidate motion vectors may be defined by a list of candidate motion vectors formed by motion vectors of neighboring blocks.

Motion vectors are usually at least partially determined at the encoder side and signaled to the decoder within the coded bitstream. However, the motion vectors may also be derived at the decoder. In such case, the current block is not available at the decoder and cannot be used for calculating the similarity to the blocks to which the candidate motion vectors point in the reference picture. Therefore, instead of the current block, a template is used which is constructed out of pixels of already decoded blocks. For instance, already decoded pixels adjacent to the current block may be used. Such motion estimation provides an advantage of reducing the signaling: the motion vector is derived in the same way at both the encoder and the decoder and thus, no signaling is needed. On the other hand, the accuracy of such motion estimation may be lower.

In order to provide a tradeoff between the accuracy and signaling overhead, the motion vector estimation may be divided into two steps: motion vector derivation and motion vector refinement. For instance, a motion vector derivation may include selection of a motion vector from the list of candidates. Such a selected motion vector may be further refined for instance by a search within a search space. The search in the search space is based on calculating cost function for each candidate motion vector, i.e. for each candidate position of block to which the candidate motion vector points.

Document JVET-D0029: Decoder-Side Motion Vector Refinement Based on Bilateral Template Matching, X. Chen, J. An, J. Zheng (the document can be found at: phenix.it-sudparis.eu/jvet/site) shows motion vector refinement in which a first motion vector in integer pixel resolution is found and further refined by a search with a half-pixel resolution in a search space around the first motion vector.

In order to perform motion vector refinement, it is necessary to store at least those samples in the memory, which are necessary for the current block to perform the refinement, i.e. the samples which correspond to the search space and samples which can be accessed when template matching in the search space is performed.

External memory access is an important design parameter in present hardware architectures and/or software implementations. This is caused by the fact that the external memory access slows down the processing in comparison with the intern memory utilization. On the other hand, internal memory on chip is limited, for instance due to the chip size implementation.

SUMMARY

The inventors have recognized that motion vector refinement when implemented in combination with fractional interpolation may require further increase of on-chip memory size or even external memory access. Both options may be undesirable. Moreover, when the initial motion vector points to a fractional position, i.e. a position with fractional coordinate, the search space including sample in 1-sample or multiples of 1-sample distance from each other and the initial motion vector result in fractional positions which are to be all interpolated.

In view of the above mentioned problem, the present disclosure provides motion vector prediction which enables taking into account the number of accesses to the external memory and the number of samples that are necessary to be accessible for motion vector refinement of a motion vector for a coding block. This may be achieved by rounding the initial motion vector coordinates in case they are fractional.

According to an aspect of the disclosure, an apparatus is provided for determination of a motion vector for a prediction block, the apparatus comprising a processing circuitry configured to: obtain an initial motion vector and a template for the prediction block; determine a refinement of the initial motion vector by template matching with the template in a search space. When the initial motion vector points to a fractional sample position, the search space is located on a position given by rounding the fractional position pointed to by the initial motion vector to an integer sample position.

Such apparatus may provide an advantage of reducing the number of fractional positions necessary for the template matching, which on one hand reduces the complexity since less interpolation operations are necessary and, on the other hand, reduces the number of additional integer samples necessary for the memory access window, since the number of fractional positions and thus also integer sample positions necessary for their interpolation is reduced.

In one embodiment, the processing circuitry is further configured for calculating the template matching cost for the initial motion vector pointing to the fractional sample position; comparing the calculated template matching cost of the fractional sample position with the template matching cost of the determined refinement of the initial motion vector; and determining the motion vector for the prediction block based on the fractional sample position if the template matching cost of the determined refinement is not lower than the calculated template matching cost of the fractional sample position.

For example, the search space consists of sample positions spaced by integer sample step from each other. The search space is formed, for instance, by K rows and L columns of samples located in rows and columns in integer distance from each other, wherein the rounded fractional position is one of the samples of the search space.

According to an example, the rounded fractional position is located substantially in the center of the search space.

The processing circuitry can be further configured to perform the template matching for a search space of which the sample positions are determined in a plurality of steps including: determining an integer search space consisting of sample positions spaced by integer sample step from each other; performing template matching in the integer search space to obtain a best matching integer position; based on the best matching integer position, determining a fractional search space with at least one sample spaced by less than integer sample step from the closest integer search space sample positions; and performing template matching in the fractional search space to obtain a best matching position.

In one example, the rounding is obtained as an integer sample position closest to the fractional position to which the initial motion vector points.

If there are more than one integer sample position equally close to the fractional position, in one example, the rounding is obtained as an integer sample position in a predefined direction, the predefined direction being left, right, top or bottom.

If there are more than one integer sample positions equally close to the fractional position, in another example, the search space is a unity of a search space located on the more than one integer sample positions equally close to the fractional position.

If there are more than one integer sample positions equally close to the fractional position, in yet another example, the rounding is obtained as the one among the equally close integer sample positions which results in a shorter magnitude of the rounded initial motion vector.

According to an aspect of the disclosure, an apparatus is provided for encoding a prediction block including: the apparatus for determination of a motion vector for the prediction block as described above; and an encoding unit for encoding differences between the prediction block and a predictor obtained according to the motion vector, resulting in a bitstream.

According to another aspect of the disclosure, an apparatus is provided for decoding a prediction block from a bitstream including: a decoding unit for decoding from the bitstream differences between the prediction block and a predictor obtained according to a motion vector; the apparatus for determination of the motion vector for the prediction block as described above; a motion prediction unit for determining the predictor according to the motion vector; and a reconstructor for reconstructing the prediction block from the predictor and the decoded differences.

According to an aspect of the disclosure, a method is provided for determination of a motion vector for a prediction block, the method including the steps of: obtaining an initial motion vector and a template for the prediction block; determining a refinement of the initial motion vector by template matching with the template in a search space. When the initial motion vector points to a fractional sample position, the search space is located on a position given by rounding the fractional position pointed to by the initial motion vector to an integer sample position.

In one embodiment, the method further comprises the steps of: calculating the template matching cost for the initial motion vector pointing to the fractional sample position; comparing the calculated template matching cost of the fractional sample position with the template matching cost of the determined refinement of the initial motion vector; and determining the motion vector for the prediction block based on the fractional sample position if the template matching cost of the determined refinement is not lower than the calculated template matching cost of the fractional sample position.

In an exemplary implementation, the search space consists of sample positions spaced by integer sample step from each other.

For instance, the search space is formed by K rows and L columns of samples located in rows and columns in integer distance from each other, wherein the rounded fractional position is one of the samples of the search space. K and L here are non-zero integers of which at least one is larger than 1.

The rounded fractional position may be located substantially in the center of the search space.

In one embodiment, which may be combined with any of the above embodiments and examples, the template matching is performed for a search space of which the sample positions are determined in a plurality of steps including: determining an integer search space consisting of sample positions spaced by integer sample step from each other; performing template matching in the integer search space to obtain a best matching integer position; based on the best matching integer position, determining a fractional search space with at least one sample spaced by less than integer sample step from the closest integer search space sample positions; and performing template matching in the fractional search space to obtain a best matching position.

In addition or alternatively to the above embodiments and examples, the rounding is obtained as an integer sample position closest to the fractional position to which the initial motion vector points.

In one example, if there are more than one integer sample position equally close to the fractional position, the rounding is obtained as an integer sample position in a predefined direction, the predefined direction being left, right, top or bottom.

In another example, if there are more than one integer sample positions equally close to the fractional position, the search space is a unity of a search space located on the more than one integer sample positions equally close to the fractional position.

In still another example, if there are more than one integer sample positions equally close to the fractional position, the rounding is obtained as the one among the equally close integer sample positions, which results in a shorter magnitude of the rounded initial motion vector.

According to an aspect of the disclosure, a method is provided for encoding a prediction block including the steps of determining of a motion vector for the prediction block according to any of the above described embodiments and examples; and encoding differences between the prediction block and a predictor obtained according to the motion vector, resulting in a bitstream.

According to an aspect of the disclosure, a method is provided for decoding a prediction block from a bitstream. The method includes the steps of: decoding from the bitstream differences between the prediction block and a predictor obtained according to a motion vector; determining of the motion vector for the prediction block according to any of the above described embodiments and examples; determining the predictor according to the motion vector; and reconstructing the prediction block from the predictor and the decoded differences.

According to an aspect of the disclosure a non-transitory computer-readable storage medium is provided storing instructions which when executed by a processor/processing circuitry perform the steps according to any of the above aspects or embodiments or their combinations.

BRIEF DESCRIPTION OF DRAWINGS

In the following, exemplary embodiments are described in more detail with reference to the attached figures and drawings, in which:

FIG. 3 is a schematic drawing illustrating an exemplary template matching suitable for bi-prediction;

FIG. 4 is a schematic drawing illustrating an exemplary template matching suitable for uni- and bi-prediction;

DETAILED DESCRIPTION

As mentioned above, the external memory access is one of the most important design considerations in today's hardware and software architectures. Motion vector estimation especially when including template matching, for instance in case of motion vector refinement, may also be used with interpolation filtering to obtain fractional positions of the search space. Use of the interpolation filtering may require increase of the number of samples which need to be accessed from the memory. However, this may lead to either increase of the expensive on-chip memory or to increased number of external memory accesses, which on the other hand slows down the implementation. Especially at the decoder side, these problems may lead to more expensive or slower applications which is not desirable.

According to the present disclosure, in order to limit the memory access window, the interpolation of the fractional positions is reduced or avoided by determining the search space relatively to the position pointed to by the initial motion vector shifted to the closest integer position.

According to an embodiment of the disclosure an apparatus is provided for determination of a motion vector for a prediction block including a processing circuitry. The processing circuitry is configured to obtain an initial motion vector and a template for the prediction block and to determine a refinement of the initial motion vector by template matching with the template in a search space. When the initial motion vector points to a fractional sample position, the search space is located on a position given by rounding the fractional position pointed to by the initial motion vector to an integer sample position.

Figure 1:
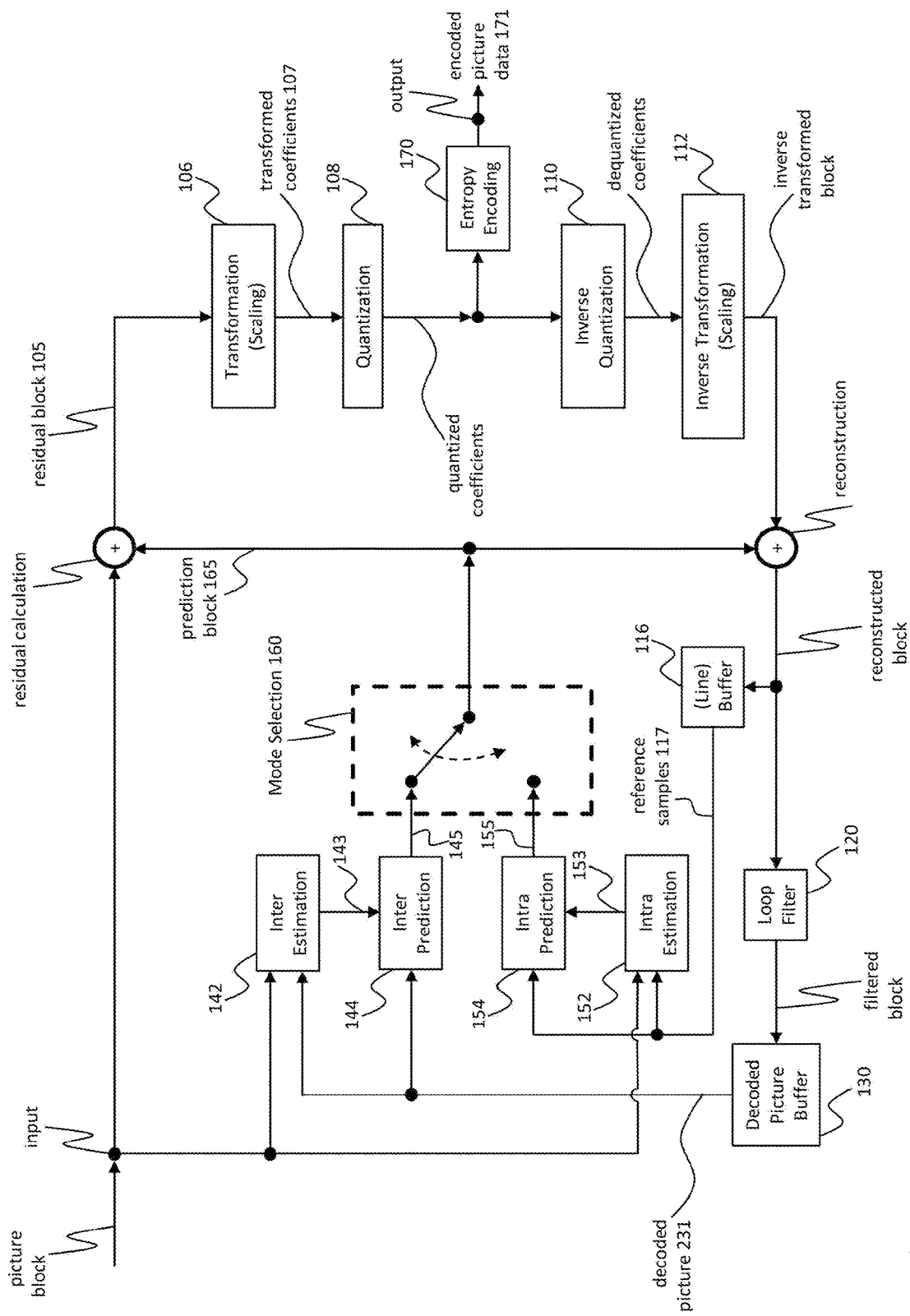
FIG. 1 is a block diagram showing an exemplary structure of an encoder in which the motion vector derivation and refinement may be employed.

FIG. 1 shows an encoder 100 which comprises an input for receiving input image samples of frames or pictures of a video stream and an output for generating an encoded video bitstream. The term "frame" in this disclosure is used as a synonym for picture. However, it is noted that the present disclosure is also applicable to fields in case interlacing is applied. In general, a picture includes m times n pixels. This corresponds to image samples and may comprise one or more color components. For the sake of simplicity, the following description refers to pixels meaning samples of luminance. However, it is noted that the motion vector search of the disclosure can be applied to any color component including chrominance or components of a search space such as RGB or the like. On the other hand, it may be beneficial to only perform motion vector estimation for one component and to apply the determined motion vector to more (or all) components.

The input blocks to be coded do not necessarily have the same size. One picture may include blocks of different sizes and the block raster of different pictures may also differ.

In an explicative realization, the encoder 100 is configured to apply prediction, transformation, quantization, and entropy coding to the video stream. The transformation, quantization, and entropy coding are carried out respectively by a transform unit 106, a quantization unit 108 and an entropy encoding unit 170 so as to generate as an output the encoded video bitstream.

The video stream may include a plurality of frames, wherein each frame is divided into blocks of a certain size that are either intra or inter coded. The blocks of for example the first frame of the video stream are intra coded by means of an intra prediction unit 154. An intra frame is coded using only the information within the same frame, so that it can be independently decoded and it can provide an entry point in the bitstream for random access. Blocks of other frames of the video stream may be inter coded by means of an inter prediction unit 144: information from previously coded frames (reference frames) is used to reduce the temporal redundancy, so that each block of an inter-coded frame is predicted from a block in a reference frame. A mode selection unit 160 is configured to select whether a block of a frame is to be processed by the intra prediction unit 154 or the inter prediction unit 144. This mode selection unit 160 also controls the parameters of intra or inter prediction. In order to enable refreshing of the image information, intra-coded blocks may be provided within inter-coded frames. Moreover, intra-frames which contain only intra-coded blocks may be regularly inserted into the video sequence in order to provide entry points for decoding, i.e. points where the decoder can start decoding without having information from the previously coded frames.

The intra estimation unit 152 and the intra prediction unit 154 are units which perform the intra prediction. In particular, the intra estimation unit 152 may derive the prediction mode based also on the knowledge of the original image while intra prediction unit 154 provides the corresponding predictor, i.e. samples predicted using the selected prediction mode, for the difference coding. For performing spatial or temporal prediction, the coded blocks may be further processed by an inverse quantization unit 110, and an inverse transform unit 112. After reconstruction of the block a loop filtering unit 120 is applied to further improve the quality of the decoded image. The filtered blocks then form the reference frames that are then stored in a decoded picture buffer 130. Such decoding loop (decoder) at the encoder side provides the advantage of producing reference frames which are the same as the reference pictures reconstructed at the decoder side. Accordingly, the encoder and decoder side operate in a corresponding manner. The term "reconstruction" here refers to obtaining the reconstructed block by adding to the decoded residual block the prediction block.

The inter estimation unit 142 receives as an input a block of a current frame or picture to be inter coded and one or several reference frames from the decoded picture buffer 130. Motion estimation is performed by the inter estimation unit 142 whereas motion compensation is applied by the inter prediction unit 144. The motion estimation is used to obtain a motion vector and a reference frame based on certain cost function, for instance using also the original image to be coded. For example, the motion estimation unit 142 may provide initial motion vector estimation. The initial motion vector may then be signaled within the bitstream in form of the vector directly or as an index referring to a motion vector candidate within a list of candidates constructed based on a predetermined rule in the same way at the encoder and the decoder. The motion compensation then derives a predictor of the current block as a translation of a block co-located with the current block in the reference frame to the reference block in the reference frame, i.e. by a motion vector. The inter prediction unit 144 outputs the prediction block for the current block, wherein the prediction block minimizes the cost function. For instance, the cost function may be a difference between the current block to be coded and its prediction block, i.e. the cost function minimizes the residual block. The minimization of the residual block is based e.g. on calculating a sum of absolute differences (SAD) between all pixels (samples) of the current block and the candidate block in the candidate reference picture. However, in general, any other similarity metric may be employed, such as mean square error (MSE) or structural similarity metric (SSIM).

However, cost-function may also be the number of bits necessary to code such inter-block and/or distortion resulting from such coding. Thus, the rate-distortion optimization procedure may be used to decide on the motion vector selection and/or in general on the encoding parameters such as whether to use inter or intra prediction for a block and with which settings.

The intra estimation unit 152 and inter prediction unit 154 receive as an input a block of a current frame or picture to be intra coded and one or several reference samples from an already reconstructed area of the current frame. The intra prediction then describes pixels of a current block of the current frame in terms of a function of reference samples of the current frame. The intra prediction unit 154 outputs a prediction block for the current block, wherein the prediction block advantageously minimizes the difference between the current block to be coded and its prediction block, i.e., it minimizes the residual block. The minimization of the residual block can be based e.g. on a rate-distortion optimization procedure. In particular, the prediction block is obtained as a directional interpolation of the reference samples. The direction may be determined by the rate-distortion optimization and/or by calculating a similarity measure as mentioned above in connection with inter-prediction.

The inter estimation unit 142 receives as an input a block or a more universal-formed image sample of a current frame or picture to be inter coded and two or more already decoded pictures 231. The inter prediction then describes a current image sample of the current frame in terms of motion vectors to reference image samples of the reference pictures. The inter prediction unit 142 outputs one or more motion vectors for the current image sample, wherein the reference image samples pointed to by the motion vectors advantageously minimize the difference between the current image sample to be coded and its reference image samples, i.e., it minimizes the residual image sample. The predictor for the current block is then provided by the inter prediction unit 144 for the difference coding.

The difference between the current block and its prediction, i.e. the residual block 105, is then transformed by the transform unit 106. The transform coefficients 107 are quantized by the quantization unit 108 and entropy coded by the entropy encoding unit 170. The thus generated encoded picture data 171, i.e. encoded video bitstream, comprises intra coded blocks and inter coded blocks and the corresponding signaling (such as the mode indication, indication of the motion vector, and/or intra-prediction direction). The transform unit 106 may apply a linear transformation such as a Fourier or Discrete Cosine Transformation (DFT/FFT or DCT). Such transformation into the spatial frequency domain provides the advantage that the resulting coefficients 107 have typically higher values in the lower frequencies. Thus, after an effective coefficient scanning (such as zig-zag), and quantization, the resulting sequence of values has typically some larger values at the beginning and ends with a run of zeros. This enables further efficient coding. Quantization unit 108 performs the actual lossy compression by reducing the resolution of the coefficient values. The entropy coding unit 170 then assigns to coefficient values binary codewords to produce a bitstream. The entropy coding unit 170 also codes the signaling information (not shown in FIG. 1).

Figure 2:
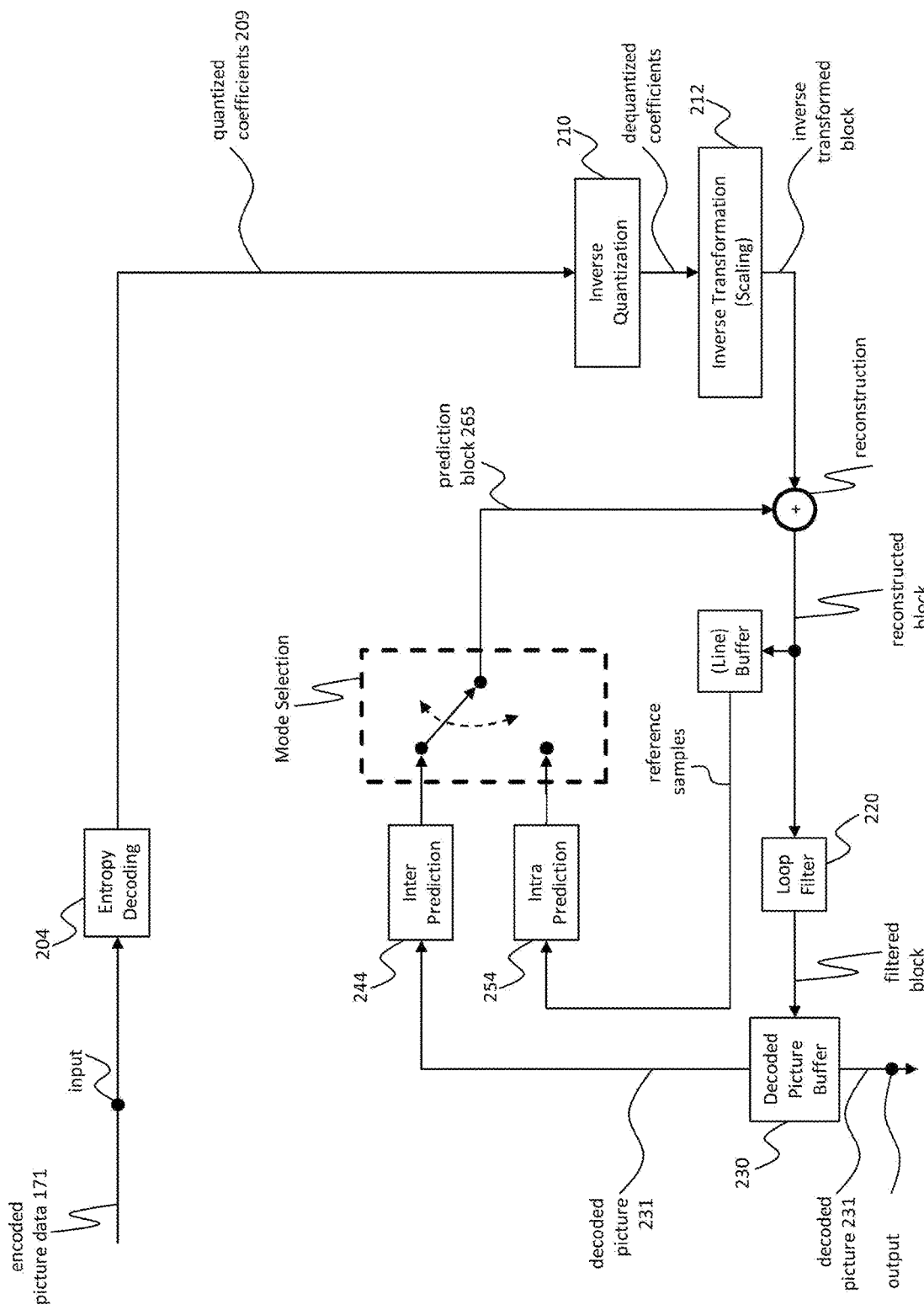
FIG. 2 is a block diagram showing an exemplary structure of a decoder in which the motion vector derivation and refinement may be employed.

FIG. 2 shows a video decoder 200. The video decoder 200 comprises particularly a decoded picture buffer 230, an inter prediction unit 244 and an intra prediction unit 254, which is a block prediction unit. The decoded picture buffer 230 is configured to store at least one (for uni-prediction) or at least two (for bi-prediction) reference frames reconstructed from the encoded video bitstream, the reference frames being different from a current frame (currently decoded frame) of the encoded video bitstream. The intra prediction unit 254 is configured to generate a prediction block, which is an estimate of the block to be decoded. The intra prediction unit 254 is configured to generate this prediction based on reference samples that are obtained from the decoded picture buffer 230.

The decoder 200 is configured to decode the encoded video bitstream generated by the video encoder 100, and preferably both the decoder 200 and the encoder 100 generate identical predictions for the respective block to be encoded/decoded. The features of the decoded picture buffer 230 and the intra prediction unit 254 are similar to the features of the decoded picture buffer 130 and the intra prediction unit 154 of FIG. 1.

The video decoder 200 comprises further units that are also present in the video encoder 100 like e.g. an inverse quantization unit 210, an inverse transform unit 212, and a loop filtering unit 220, which respectively correspond to the inverse quantization unit 110, the inverse transform unit 112, and the loop filtering unit 120 of the video coder 100.

An entropy decoding unit 204 is configured to decode the received encoded video bitstream and to correspondingly obtain quantized residual transform coefficients 209 and signaling information. The quantized residual transform coefficients 209 are fed to the inverse quantization unit 210 and an inverse transform unit 212 to generate a residual block. The residual block is added to a prediction block 265 and the addition is fed to the loop filtering unit 220 to obtain the decoded video. Frames of the decoded video can be stored in the decoded picture buffer 230 and serve as a decoded picture 231 for inter prediction.

Generally, the intra prediction units 154 and 254 of FIGS. 1 and 2 can use reference samples from an already encoded area to generate prediction signals for blocks that need to be encoded or need to be decoded.

The entropy decoding unit 204 receives as its input the encoded bitstream 171. In general, the bitstream is at first parsed, i.e. the signaling parameters and the residuals are extracted from the bitstream. Typically, the syntax and semantic of the bitstream is defined by a standard so that the encoders and decoders may work in an interoperable manner. As described in the above Background section, the encoded bitstream does not only include the prediction residuals. In case of motion compensated prediction, a motion vector indication is also coded in the bitstream and parsed therefrom at the decoder. The motion vector indication may be given by means of a reference picture in which the motion vector is provided and by means of the motion vector coordinates. So far, coding the complete motion vectors was considered. However, also only the difference between the current motion vector and the previous motion vector in the bitstream may be encoded. This approach allows exploiting the redundancy between motion vectors of neighboring blocks.

In order to efficiently code the reference picture, H.265 codec (ITU-T, H265, Series H: Audiovisual and multimedia systems: High Efficient Video Coding) provides a list of reference pictures assigning to list indices respective reference frames. The reference frame is then signaled in the bitstream by including therein the corresponding assigned list index. Such list may be defined in the standard or signaled at the beginning of the video or a set of a number of frames. It is noted that in H.265 there are two lists of reference pictures defined, called L0 and L1. The reference picture is then signaled in the bitstream by indicating the list (L0 or L1) and indicating an index in that list associated with the desired reference picture. Providing two or more lists may have advantages for better compression. For instance, L0 may be used for both uni-directionally inter-predicted slices and bi-directionally inter-predicted slices while L1 may only be used for bi-directionally inter-predicted slices. However, in general the present disclosure is not limited to any content of the L0 and L1 lists.

The lists L0 and L1 may be defined in the standard and fixed. However, more flexibility in coding/decoding may be achieved by signaling them at the beginning of the video sequence. Accordingly, the encoder may configure the lists L0 and L1 with particular reference pictures ordered according to the index. The L0 and L1 lists may have the same fixed size. There may be more than two lists in general. The motion vector may be signaled directly by the coordinates in the reference picture. Alternatively, as also specified in H.265, a list of candidate motion vectors may be constructed and an index associated in the list with the particular motion vector can be transmitted.

Motion vectors of the current block are usually correlated with the motion vectors of neighboring blocks in the current picture or in the earlier coded pictures. This is because neighboring blocks are likely to correspond to the same moving object with similar motion and the motion of the object is not likely to change abruptly over time. Consequently, using the motion vectors in neighboring blocks as predictors reduces the size of the signaled motion vector difference. The Motion Vector Predictors (MVPs) are usually derived from already encoded/decoded motion vectors from spatial neighboring blocks or from temporally neighboring blocks in the co-located picture. In H.264/AVC, this is done by doing a component wise median of three spatially neighboring motion vectors. Using this approach, no signaling of the predictor is required. Temporal MVPs from a co-located picture are only considered in the so called temporal direct mode of H.264/AVC. The H.264/AVC direct modes are also used to derive other motion data than the motion vectors. Hence, they relate more to the block merging concept in HEVC. In HEVC, the approach of implicitly deriving the MVP was replaced by a technique known as motion vector competition, which explicitly signals which MVP from a list of MVPs, is used for motion vector derivation. The variable coding quad-tree block structure in HEVC can result in one block having several neighboring blocks with motion vectors as potential MVP candidates. Taking the left neighbor as an example, in the worst case a 64×64 luma prediction block could have 16 4×4 luma prediction blocks to the left when a 64×64 luma coding tree block is not further split and the left one is split to the maximum depth.

Advanced Motion Vector Prediction (AMVP) was introduced to modify motion vector competition to account for such a flexible block structure. During the development of HEVC, the initial AMVP design was significantly simplified to provide a good trade-off between coding efficiency and an implementation friendly design. The initial design of AMVP included five MVPs from three different classes of predictors: three motion vectors from spatial neighbors, the median of the three spatial predictors and a scaled motion vector from a co-located, temporally neighboring block. Furthermore, the list of predictors was modified by reordering to place the most probable motion predictor in the first position and by removing redundant candidates to assure minimal signaling overhead. The final design of the AMVP candidate list construction includes the following two MVP candidates: a) up to two spatial candidate MVPs that are derived from five spatial neighboring blocks; b) one temporal candidate MVPs derived from two temporal, co-located blocks when both spatial candidate MVPs are not available or they are identical; and c) zero motion vectors when the spatial, the temporal or both candidates are not available. Details on motion vector determination can be found in the book by V. Sze et al (Ed.), High Efficiency Video Coding (HEVC): Algorithms and Architectures, Springer, 2014, in particular in Chapter 5, incorporated herein by reference.

In order to further improve motion vector estimation without further increase in signaling overhead, it may be beneficial to further refine the motion vectors derived at the encoder side and provided in the bitstream. The motion vector refinement may be performed at the decoder without assistance from the encoder. The encoder in its decoder loop may employ the same refinement to obtain corresponding motion vectors. Motion vector refinement is performed in a search space which includes integer pixel positions and fractional pixel positions of a reference picture. For example, the fractional pixel positions may be half-pixel positions or quarter-pixel or further fractional positions. The fractional pixel positions may be obtained from the integer (full-pixel) positions by interpolation such as bi-linear interpolation.

In a bi-prediction of current block, two prediction blocks obtained using the respective first motion vector of list L0 and the second motion vector of list L1, are combined to a single prediction signal, which can provide a better adaptation to the original signal than uni-prediction, resulting in less residual information and possibly a more efficient compression.

Since at the decoder, the current block is not available since it is being decoded, for the purpose of motion vector refinement, a template is used, which is an estimate of the current block and which is constructed based on the already processed (i.e. coded at the encoder side and decoded at the decoder side) image portions.

First, an estimate of the first motion vector MV0 and an estimate of the second motion vector MV1 are received as input at the decoder 200. At the encoder side 100, the motion vector estimates MV0 and MV1 may be obtained by block matching and/or by search in a list of candidates (such as merge list) formed by motion vectors of the blocks neighboring to the current block (in the same picture or in adjacent pictures). MV0 and MV1 are then advantageously signaled to the decoder side within the bitstream. However, it is noted that in general, also the first determination stage at the encoder could be performed by template matching which would provide the advantage of reducing signaling overhead.

At the decoder side 200, the motion vectors MV0 and MV1 are advantageously obtained based on information in the bitstream. The MV0 and MV1 are either directly signaled, or differentially signaled, and/or an index in the list of motion vector (merge list) is signaled. However, the present disclosure is not limited to signaling motion vectors in the bitstream. Rather, the motion vector may be determined by template matching already in the first stage, correspondingly to the operation of the encoder. The template matching of the first stage (motion vector derivation) may be performed based on a search space different from the search space of the second, refinement stage. In particular, the refinement may be performed on a search space with higher resolution (i.e. shorter distance between the search positions).

An indication of the two reference pictures RefPic0 and RefPic1, to which respective MV0 and MV1 point, are provided to the decoder as well. The reference pictures are stored in the decoded picture buffer at the encoder and decoder side as a result of previous processing, i.e. respective encoding and decoding. One of these reference pictures is selected for motion vector refinement by search. A reference picture selection unit of the apparatus for the determination of motion vectors is configured to select the first reference picture to which MV0 points and the second reference picture to which MV1 points. Following the selection, the reference picture selection unit determines whether the first reference picture or the second reference picture is used for performing of motion vector refinement. For performing motion vector refinement, the search region in the first reference picture is defined around the candidate position to which motion vector MV0 points. The candidate search space positions within the search region are analyzed to find a block most similar to a template block by performing template matching within the search space and determining a similarity metric such as the sum of absolute differences (SAD). The positions of the search space denote the positions on which the top left corner of the template is matched. As already mentioned above, the top left corner is a mere convention and any point of the search space such as the central point can in general be used to denote the matching position.

According to the above mentioned document JVET-D0029, the decoder-side motion vector refinement (DMVR) has as an input the initial motion vectors MV0 and MV1 which point into two respective reference pictures RefPict0 and RefPict1. These initial motion vectors are used for determining the respective search spaces in the RefPict0 and RefPict1. Moreover, using the motion vectors MV0 and MV1, a template is constructed based on the respective blocks (of samples) A and B pointed to by MV0 and MV1 as follows:

Template=function((Block $A$,Block $B$)).

The function may be sample clipping operation in combination with sample-wise weighted summation. The template is then used to perform template matching in the search spaces determined based on MV0 and MV1 in the respective reference pictures 0 and 1. The cost function for determining the best template match in the respective search spaces is SAD(Template, Block candA'), where block candA' is the candidate coding block which is pointed by the candidate MV in the search space spanned on a position given by the MV0. FIG. 3 illustrates the determination of the best matching block A' and the resulting refined motion vector MV0'. Correspondingly, the same template is used to find best matching block B' and the corresponding motion vector MV1' which points to block B' as shown in FIG. 3. In other words, after the template is constmcted based on the block A and B pointed to by the initial motion vectors MV0 and MV1, the refined motion vectors MV0' and MV1' are found via search on RefPic0 and RefPic1 with the template.

Motion vector derivation techniques are sometimes also referred to as frame rate up-conversion (FRUC). The initial motion vectors MV0 and MV1 may generally be indicated in the bitstream to ensure that encoder and decoder may use the same initial point for motion vector refinement. Alternatively, the initial motion vectors may be obtained by providing a list of initial candidates including one or more initial candidates. For each of them a refined motion vector is determined and at the end, the refined motion vector minimizing the cost function is selected.

It is further noted that the present disclosure is not limited to the template matching as described above with reference to FIG. 3. FIG. 4 illustrates an alternative template matching which is also applicable for uni-prediction. Details can be found in document JVET-A1001, an in particular in Section "2.4.6. Pattern matched motion vector derivation" of document JVET-A1001 which is titled "Algorithm Description of Joint Exploration Test Model 1", by Jianle Chen et. al. and which is accessible at: phenix.it-sudparis.eu/jvet/. The template in this template matching approach is determined as samples adjacent to the current bock in the current frame. As shown in FIG. 1, the already reconstructed samples adjacent to the top and left boundary of the current block may be taken, referred to as "L-shaped template".

Figure 5:
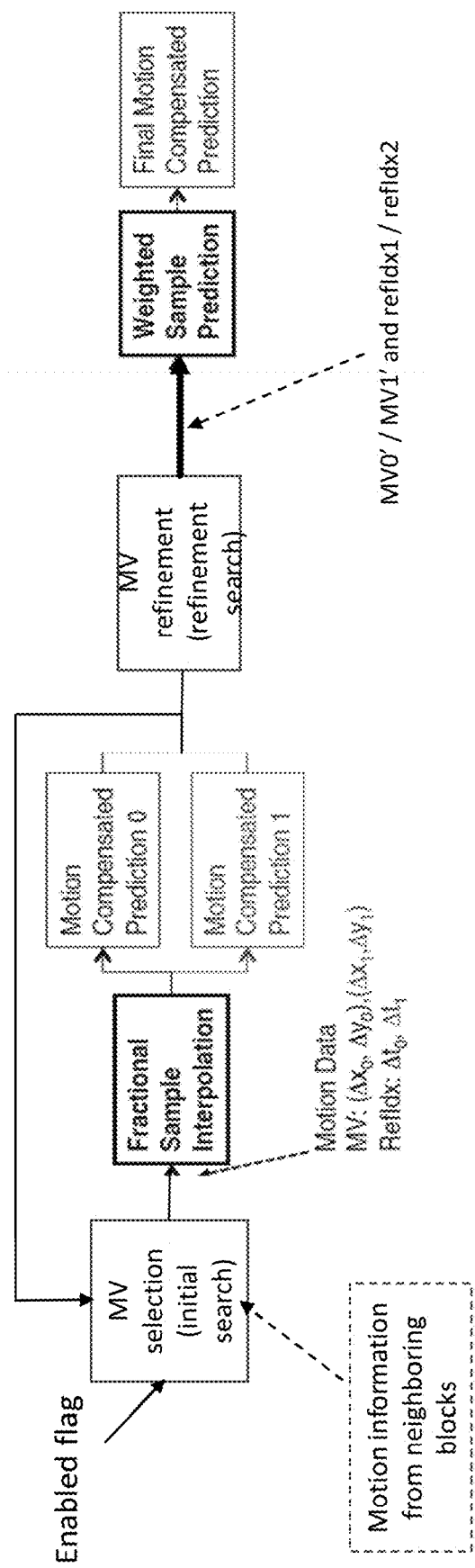
FIG. 5 is a block diagram illustrating stages of motion vector derivation operating without providing initial motion vectors to be refined in the bitstream.

FIG. 5 illustrates another type of motion vector derivation which may also be used. The input to the motion vector derivation process is a flag that indicates whether or not the motion vector derivation is applied. Implicitly, another input to the derivation process is the motion vector of a neighboring (temporally or spatially) previously coded/reconstructed block. The motion vectors of a plurality of neighboring blocks are used as candidates for the initial search step of motion vector derivation. The output of the process is MV0' (possibly also MV1', if bi-prediction is used) and the corresponding reference picture indices refPict0 and possibly refPict1 respectively. The motion vector refinement stage then includes the template matching as described above. After finding the refined one (uni-prediction) or more (bi-prediction/multi-frame prediction) motion vectors, the predictor of the current block is constructed (for bi/multi-prediction by weighted sample prediction, otherwise by referring to the samples pointed to by MV refined).

The present disclosure is not limited to the 2 template matching methods described above. As an example a third template matching method which is called bilateral matching (also described in the document JVET-A1001), can also be used for motion vector refinement and the disclosure applies similarly. According to bilateral matching, best match between two blocks along the motion trajectory of the current block in two different reference pictures is searched. Under the assumption of continuous motion trajectory, the motion vectors MV0 and MV1 pointing to the two reference blocks shall be proportional to the temporal distances, i.e., TD0 and TD1, between the current picture and the two reference pictures. In bilateral matching a cost function such as SAD(Block cand0', Block cand1') might be used where Block cand0' is pointed by MV0 and Block cand1' is pointed by MV1.

Figure 6:
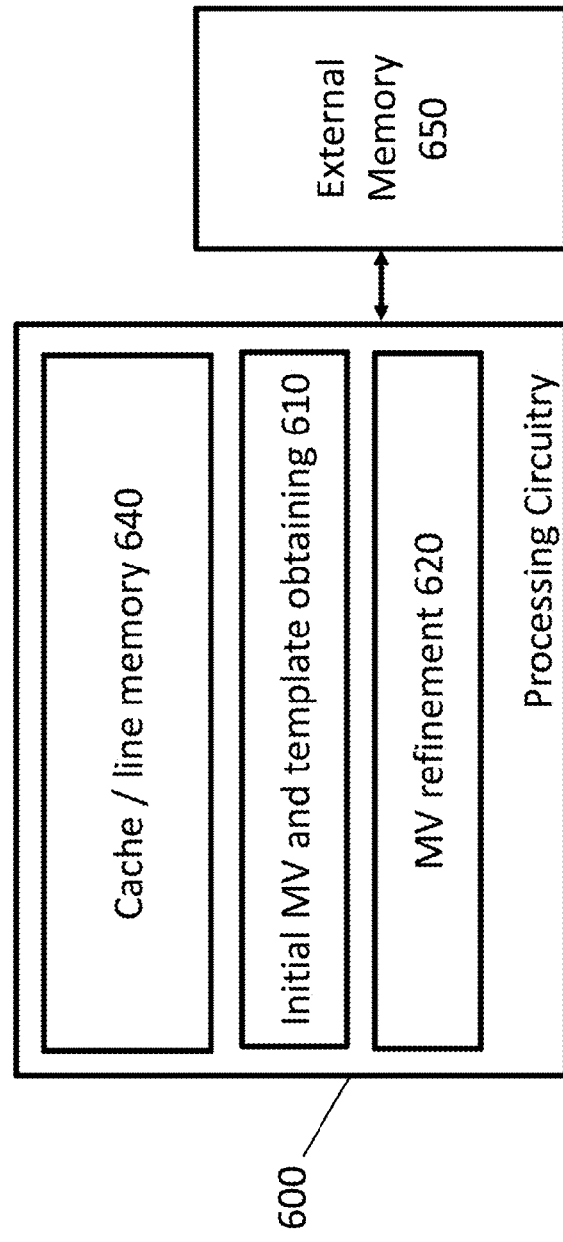
FIG. 6 is a block diagram illustrating an exemplary hardware to implement an embodiment of the disclosure.

The processing circuitry 600 is illustrated in FIG. 6. The processing circuitry may include any hardware and the configuration may be implemented by any kind of programming or hardware design of a combination of both. For instance, the processing circuitry may be formed by a single processor such as general purpose processor with the corresponding software implementing the above steps. On the other hand, the processing circuitry may be implemented by a specialized hardware such as an ASIC (Application-Specific Integrated Circuit) or FPGA (Field-Programmable Gate Array) of a DSP (Digital Signal Processor) or the like.

The processing circuitry may include one or more of the above mentioned hardware components interconnected for performing the above motion vector derivation. The processing circuitry 600 includes computation logic which implements two functionalities: obtaining the initial motion vector (or a plurality of initial motion vectors if bi-/multi-prediction is used) and template 610 and motion vector refinement 620. These two functionalities may be implemented on the same piece of hardware or may be performed by separate units of hardware such as initial motion vector and a template determination unit 610 and motion vector refinement unit 620. The processing circuitry 600 may be communicatively connected to an external memory 650 in which the reconstructed reference picture samples are stored. Moreover, the processing circuitry 600 may further include an internal memory 640 which buffers the samples in a window transferred from the external memory and used for the motion vector determination for the currently processed block. The processing circuitry may be embodied on a single chip as an integrated circuit.

It is noted that the processing circuitry may implement further functions of the encoder and/or decoder described with reference to FIGS. 1 and 2. The internal memory may be an on-chip memory such as a cache or a line memory. Chip memory is advantageously implemented on the encoder/decoder chip to speed up computations. Since the size of the chip is limited, the on-chip memory is usually small. On the other hand, the external memory can be very large in size, however the access to external memory consumes more energy and the access is much slower. Usually the all necessary information is retrieved from the external memory to on-chip memory before the computations are performed. Worst case external memory access (or bandwidth that needs to be provisioned when designing the memory bus), denotes the largest possible amount of memory transfer between external memory and the chip, while decoding a frame or coding unit. The memory (especially the external memory) can usually only be accessed in predefined block units. In other words it is generally not possible to access a single pixel, instead a smallest unit (e.g. 8×8) must be accessed. The on-chip memory size is also an important design consideration, as a larger on chip memory increases the cost.

In other words, the above mentioned apparatus may be an integrated circuit further comprising: an internal memory embedded within the integrated circuit and a memory access unit (interface) for fetching integer samples located within the window from an external memory to the internal memory.

The term "prediction block" employed above refers to the current block which is to be predicted. It is a block within the image which may be obtained by subdividing the image into equally sized or differently sized (for instance by hierarchical partitioning of a coding tree unit, CTU into the smaller units) blocks. The block may be square or more generally rectangular as these are the typical shapes also employed in current encoders/decoders. However, the present disclosure is not limited by any size/shape of the block.

The apparatus including the processing circuit may be the encoder or decoder or even an apparatus including such encoder or decoder, for instance a recording device and/or a playback device.

Fractional sample positions are positions between the real picture sample positions obtained by reconstructing the reference picture which was coded as show in FIG. 1. Thus, the fractional positions must be obtained by interpolation based on the nearest integer positions. Details of interpolation filtering can be found in Section "5.3 Fractional Sample Interpolation" of High Efficiency Video Coding (HEVC) book by V. Sze et. al., Springer, 2014.

Interpolation filtering usually applies different filters in order to generate different fractional pel (sample) positions. As an example following 1D separable filters are applied to generate quarter pel and half pel positions in H.265 video compression standard:

| Phase | Luma filter coefficients |
| --- | --- |
| 1/4 | [−1, 4, −10, 58, 17, −5, 1]/64 |
| 1/2 | [−1, 4, −11, 40, 40, −11, 4, −1]/64 |

As can be seen from the above table, the interpolation filtering requires several samples around the fractional pel position, corresponding to the filter taps (number of coefficients in the table). Using the example filters above in order to generate a half pel position 4 integer samples from left/top and right/bottom are required. It should be noted that the length of the interpolation filter is different for quarter pel sample positions (which is 7 tap) than the half pel sample positions (which is 8 tap). The terms sample, pel and pixel are used interchangeably in this application, denoting an image sample (in one or more color components) at a given time instance. A sample is in principle an intensity value.

In some embodiments of the disclosure, the interpolation filter of a predefined tap-size assesses integer samples only within a window given by integer samples accessible for the template matching in the search space. The window might include much more samples than the ones actually used in computations of a certain prediction block. This is due to the fact that the refinement search operation is usually implemented using a fast search method (as opposed to the brute force search method), according to which some of the samples are not evaluated depending on the gradual progression of the search operation. As a result the number of template matching iterations as well as the samples that are used in computations for refinement search operation might change for each prediction block.

Figure 7:
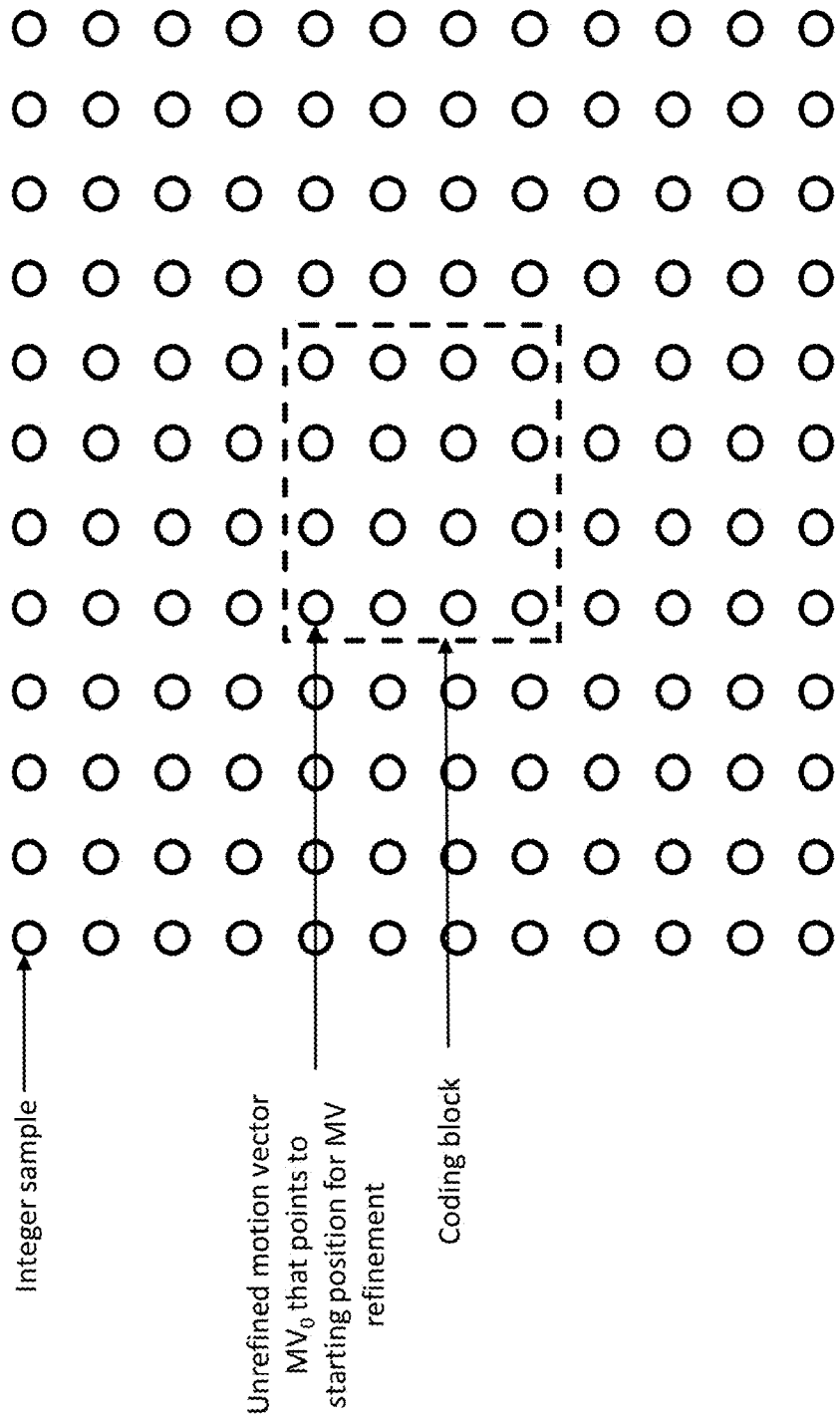
FIG. 7 is a schematic drawing illustrating for a coding block an exemplary window with samples which should be available to be accessed.

FIG. 7 illustrates a coding block (prediction block) and the corresponding samples of the window. It is noted that the samples shown in FIG. 7 are reference picture samples and the coding block here is actually a block corresponding in size and position to the current block in the current frame for which the motion vector is to be derived in the reference picture. Thus, in fact, the coding block in FIG. 7 is in fact a block co-located to the block for which the predictor is searched. However, for the simplicity reason, this block is referred as "coding block" in the following.

In this example, unrefined motion vector MV0 points to an integer sample position. The motion vector refinement search granularity is 1 integer sample, meaning that since the starting point is an integer sample, only integer sample points are searched. The search is performed, in this example, in a gradually developing search space. This means that the search space is in each iteration advanced by adding new search positions depending on the best direction in terms of cost function for the previously tested positions.

Figure 8:
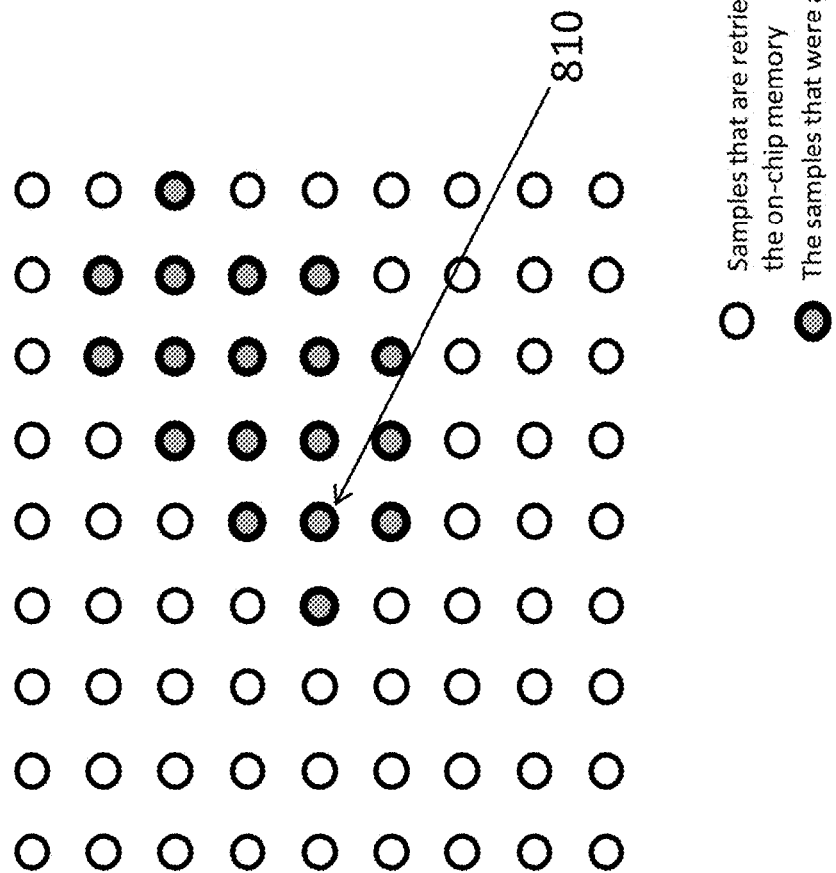
FIG. 8 is a schematic drawing illustrating iterative search space.

Such approach is illustrated in a simplified manner in FIG. 8. In FIG. 8, the initial motion vector pointed to the center point 810. The search space is gradually constructed around the initial motion vector position. In the first step, four positions immediately adjacent on the top, bottom, left and right to the position 810 pointed to by the initial motion vector as well as the position 810 pointed to by the initial motion vector are tested. Based on the direction which results in a lowest cost function among the tested five points, further positions to be tested are added to the search space. In this example, the lowest cost function could be seen in the right point and so the search space was extended by three further points in the horizontal right direction in the second step. In the second step the lowest cost function could be seen in right point (with respect to the lowest cost point of the first step), resulting in a further extension of the search space by three points in the horizontal right direction. In the third step the lowest cost function is observed again in the right point with respect to the lowest cost point of step 2 and results in the extension of the search space by three more points in the horizontal right direction. According to the example in FIG. 8, three more steps are performed in the top, top and right directions in that order. In the example a diamond shaped pattern (consisting of 5 search points) is used for each iteration and the search space is extended in order to complete the missing search points at each step.

In each iteration of the search space determination, the search space may grow by one or more integer sample position. Returning now to FIG. 7 in the example of which the maximum number of search iterations is 4. Since the maximum number of 4 iterations are possible, all of the samples depicted on the left need to be retrieved from the memory to perform the search operation, in case the gradual development of the search space goes to the left. Similarly, 4 samples extension to the top is needed. Thus, the search space is extended in both directions (left-right and top-bottom) since the refined MV can move in either direction and the hardware implementations require that all of the samples that might be required are fetched from external memory before the application of refinement search. If the search space develops in the bottom or right direction, extension by 4 further samples is necessary since the template matching with a template corresponding to the size of the coding block (prediction block) will need to access some of those samples. Moreover, the corner samples (e.g. top-right) must also be fetched from the memory, since hardware implementations typically cannot fetch irregular shapes (rectangular access is more feasible).

It is noted that the above described iterative search space development is only exemplary and the rules and number of points to extend the search space in each iteration may differ, i.e. be specified in a different way.

FIG. 8 also shows a scenario which may occur due to the external memory access rules described above. The number of samples that are fetched from the external memory is much higher than the samples that are actually used in the computation step. Assuming that the template here is only one sample large (for simplicity reason), the white circles represent samples that are retrieved from the external memory and the shaded samples that are actually used. However, such redundancy is necessary if the number of accesses to the external memory is to be kept low since when the current block is started to be processed, the actually needed samples are not yet known.

It is noted that the search space may also be defined in a different way, for instance as a stabile shape located at the position pointed to by the initial motion vector. The shape may be any shape such as square, rectangle, diamond, or the like.

Figure 9:
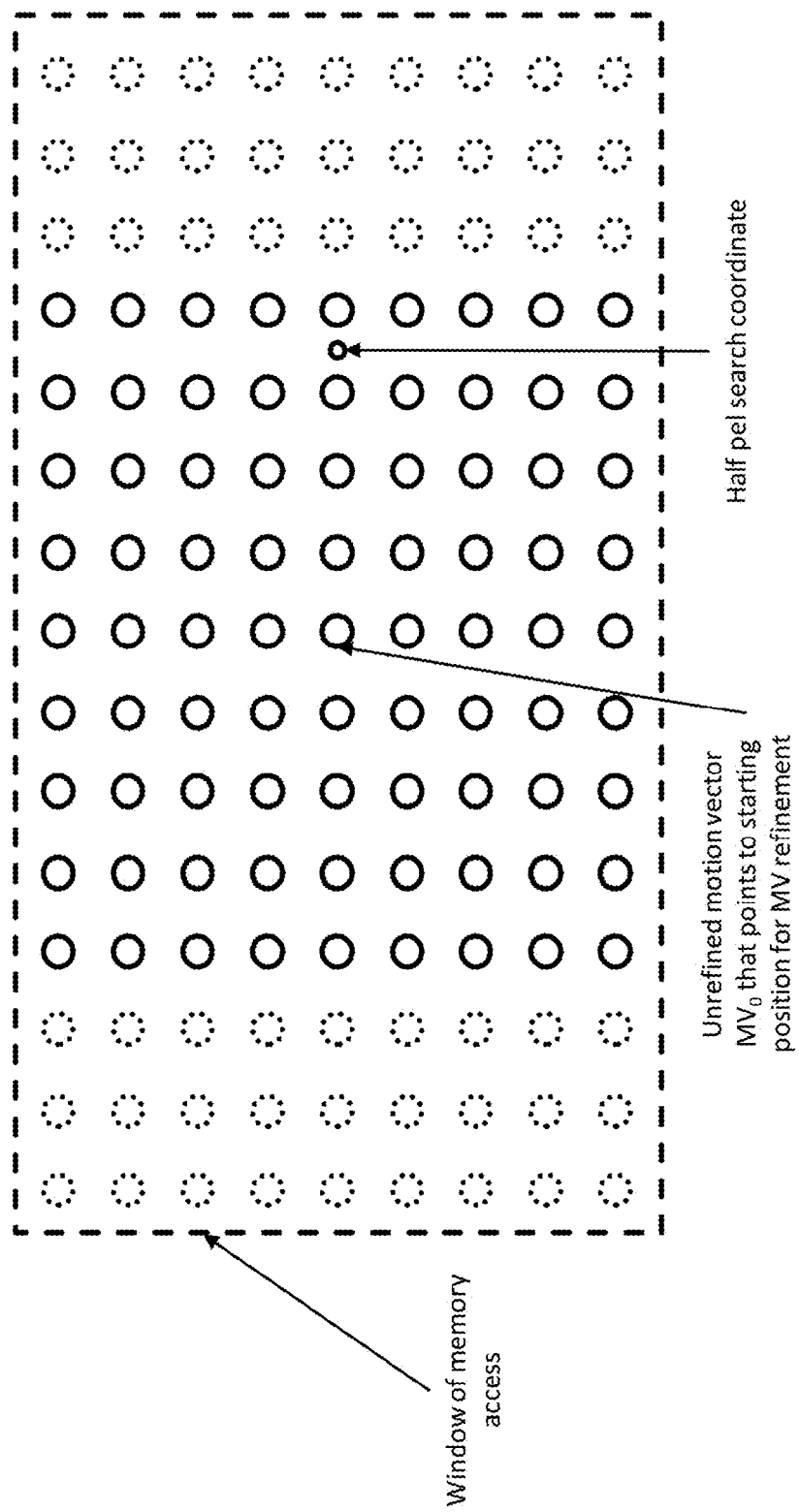
FIG. 9 is a schematic drawing illustrating extension of the memory access window in horizontal direction due to interpolation filtering.

FIG. 9 illustrates an example in which the search space may also include fractional samples. In FIGS. 7 and 8, the motion vector search was performed on integer samples resulting in the positions indicated by solid-line larger dots included in the access window. If now the search is performed on a sample that has half-pel resolution (smaller solid-line dot), in order to generate the fractional sample, depicted on the left hand side, three more columns of samples need to be retrieved from the memory as well, assuming that the interpolation filter is symmetric and has eight taps. Moreover the same must be applied on the left side (extension by 3 columns of pixels) due to the fact that search operation is symmetric (can move iteratively to the left and right) so that a fractional pixel may be located on the left side of the window.

As a result due to interpolation filtering the number of samples necessary to be retrieved from the memory is further increased, indicated by the dashed line now also included the dotted-line circles representing the positions added due to fractional interpolation. Similarly if one allows half per positions in the vertical direction to be searched as well, the window of samples to be accessed from the memory needs to be extended in the vertical direction too (not shown in the example of FIG. 9), on the top and bottom sides.

Window of memory access is defined as the rectangle that encloses all of the samples that need to be retrieved from the memory in order to perform the motion vector search for a prediction block (coding block). The window of memory access not only includes the actual samples that are required, but also all of the remaining samples that have the possibility of being accessed during the motion vector search operation.

In the example of FIG. 9, the motion vector search moved to the right. But it could have been moved to the left direction as well, which is not known beforehand. Accordingly, in order not to access the external memory several times, the window of memory access (or access window) includes all samples accessible by the respective processing.

Figure 10:
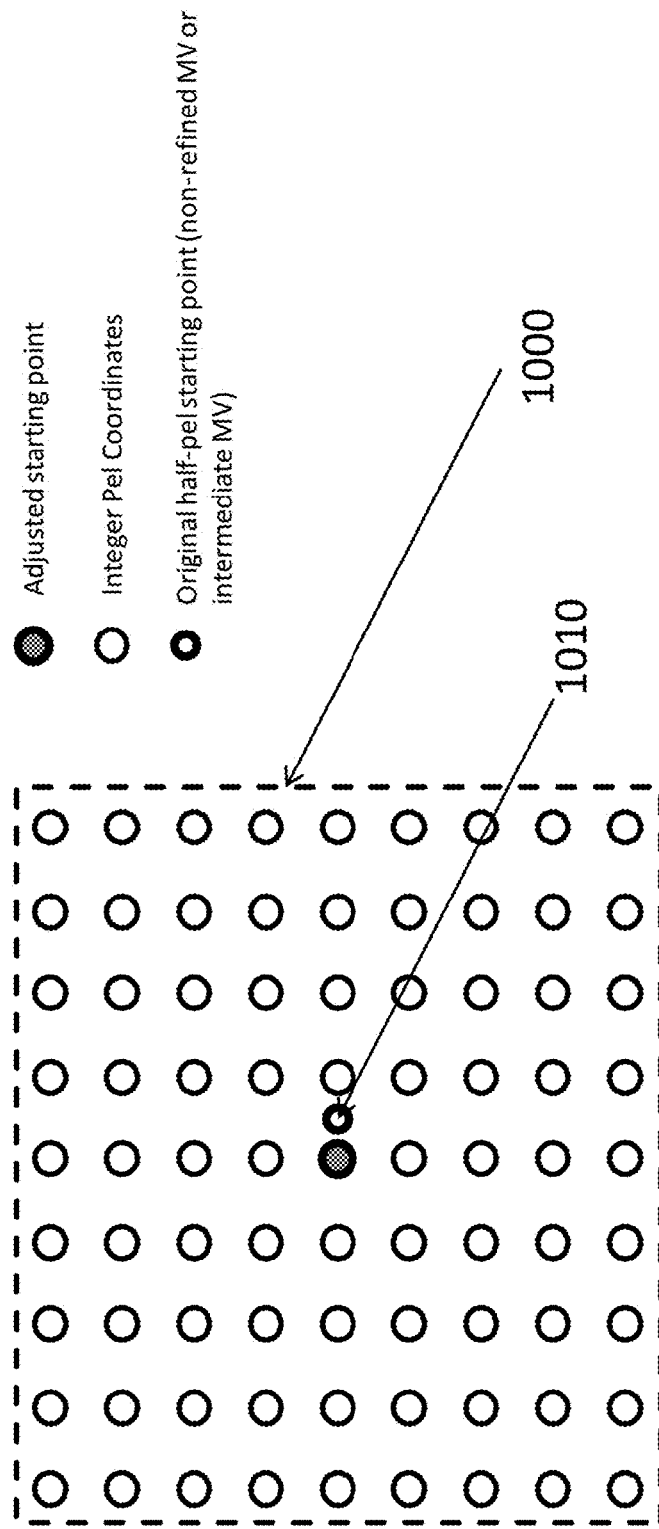
FIG. 10 is a schematic drawing illustrating adjustment of a fractional initial motion vector.

FIG. 10 shows a fractional position 1010 pointed to by an initial motion vector. In order to avoid search space construction in which the points in integer distance from the initial motion vector position would all be fractional, requiring interpolation of all these points and thus further integer positions from the memory, the fractional point 1010 is shifted to a nearest integer point (shown as shaded circle in FIG. 10). In FIG. 10, the fractional position 1010 to which the initial motion vector points is a half-pel position between two integer points, with respect to which it is located in the same distance. In such situation there can be a convention defined, which of the two equally distanced integer points are to be used. In this example, the rule left before right was followed. Similarly, a rule top before bottom may be used and horizontal before vertical, resulting in the preferred sequence: left, top, right, bottom. In other words, if the fractional position has the same distance to 4 integer positions, it will be rounded to the left top position. However, these are only examples. In general, the order may be any other order as long as it is identified so that the encoder and decoder may handle accordingly.

If there are more than one integer samples that are at the same distance to the initial motion vector, another rule that can be applied might be to choose the sample coordinate that is closest to the (0,0) center coordinate. This rule makes sense since the probability of observing a motion vector with a bigger magnitude (in either direction, along the x- and y-axes) is statistically less than a motion vector with a smaller magnitude. In other words video sequences usually contain less motion and still backgrounds (that can be predicted with smaller magnitude motion vectors), than chaotic motion and moving backgrounds (that can be predicted with bigger magnitude motion vectors).

According to the rounding rule that is presented in the above paragraph, is the vertical component (along the y-axis) of an initial motion vector is 5.5 and the horizontal component is −3.5, it is rounded as (5,3). According to the rounding rule, if the initial motion vector is closest to more than one integer sample coordinates, the initial motion vector is rounded to achieve the resulting rounded motion vector with minimum absolute magnitude along both x- and y-axes. Such rounding may be, for instance, implemented by simply cutting of the positions after comma, i.e. by function "floor".

In other words, if there are more than one integer sample positions equally close to the fractional position, the rounding is obtained as the one among the equally close integer sample positions which results in a shorter magnitude of the rounded initial motion vector.

In one embodiment, the search space consists of sample positions spaced by integer sample step from each other, as also shown in FIG. 10, in which the search space window 1000 frames the integer samples of the search space constructed around the center position (shaded circle) corresponding to the rounded and thus integer position after shifting the fractional initial motion vector position as described above.

In order to ensure that refinement of the motion vector does not worsen the initial motion vector, in one exemplary embodiment, the template matching cost for the initial motion vector pointing to the fractional sample position is calculated and compared with the template matching cost of the determined refinement of the initial motion vector. Finally, the motion vector for the prediction block is determined based on the fractional sample position if the template matching cost of the determined refinement is not lower than the calculated template matching cost of the fractional sample position. In other words, the refinement is only selected for the prediction block if it is better (in terms of the cost function) than the initial motion vector which means that the motion vector for the prediction block is determined based on the determined refinement if the template matching cost of the determined refinement is lower (or equal to) than the calculated template matching cost of the fractional sample position.

On one hand, the motion vector for the prediction block may be determined to be directly the fractional sample position if the template matching cost of the determined refinement is not lower than the calculated template matching cost of the fractional sample position. However, there might be further steps (e.g. a following template search in the fractional search space, motion vector clipping or the like) that further modifies the motion vector.

The search space may be formed by K rows and L columns of samples located in rows and columns in integer distance from each other, wherein the rounded fractional position is one of the samples of the search space. Here, K and L are integers larger than 1. As shown in FIG. 10, K and L may have equal value (9 in this example). However, in general, K and L may differ in value, i.e. the search space may be rectangular with different side lengths.

The term search space generally refers to a set of positions on each of which template matching is to be performed. These are the positions that are actually checked by the template matching, i.e. for each search space position, one respective cost function value is calculated. In contrast, the memory access window (also referred to as access window or window in this disclosure) includes the search space but may also include samples which are to be accessible for template matching, i.e. may be used to calculate cost function for at least one of the above mentioned search space positions. In the above example of search space K×L, the memory access window may have the same or larger size.

The rounded fractional position may be located substantially in the center of the search space or of the memory access window or both, as is also shown in FIG. 10. The term "substantially" here refers to the fact that if the number of rows and/or columns of the search space and/or memory access window is even, there is no integer center. In such case, the rounded fractional position would be located on one of the positions closest to the center.

However, it is noted that the present disclosure is not to be limited to the above mentioned search space configurations. In general, any search space (for instance an iteratively obtained search space as described above) may be employed. Moreover, the initial motion vector is not necessarily in the center of the search space. For instance, this is not the case for the iterative search space in which the search space develops in several iterations in direction of the lowest cost function thus extending in one particular direction from the initial motion vector, which is then not in the center thereof.

Figure 11:
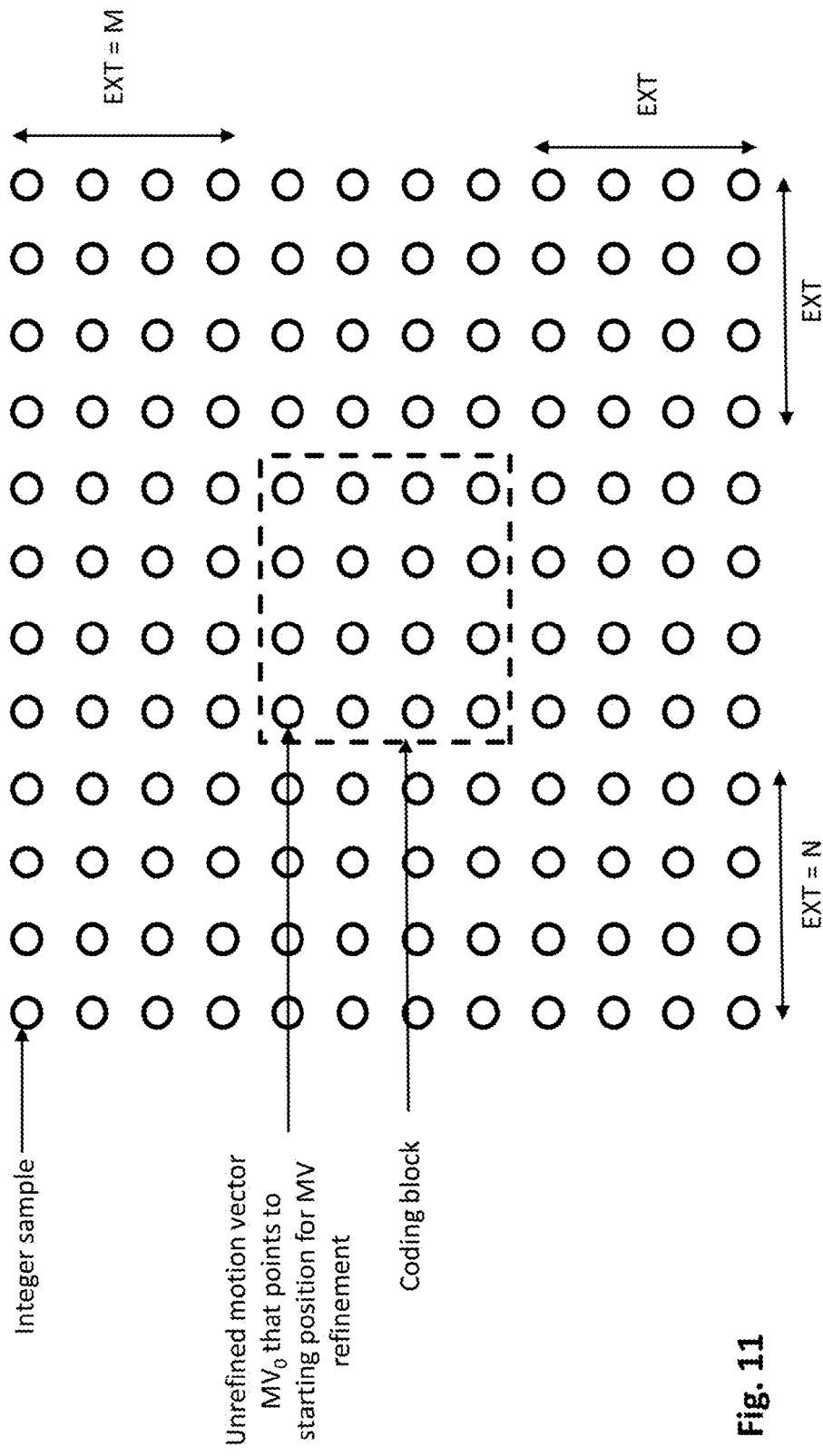
FIG. 11 is a schematic drawing illustrating definition of a sub-window for fractional sample positions.

The window for memory access may be defined in various ways. FIG. 11 illustrates an example in which the memory access window is defined as extensions EXT on the left/right or up/down of the coding block (corresponding to the location of the coding block given by the initial motion vector). The extension amounts may depend on the size and the shape of the coding or prediction block. In FIG. 11, the extension is 4 samples long in each direction (top, bottom, left, right). However, it is noted that the EXT may also take different values for the different directions, depending on the block size (which may have different size in vertical and horizontal direction) and/or the search space form and size.

For instance, according to an example, the window is defined as N integer sample columns and M integer sample rows relative to the prediction block initial motion vector, N and M being non-zero integer values. In FIG. 11, the N and M are indicated but have the same size. As mentioned above, N and M may have a different size. N and M are integers and at least one of them are non-zero. Taking parameters N and M and the template form and size, the size of the access window can be determined. In particular, if the template has T1 rows and T2 columns, the size of the memory access window may be calculated as (N+T1+N) rows and (M+T2+M) columns. This is because the search can go N samples left or right resulting in 2N samples horizontally and M samples up or down resulting in 2M samples vertically. In addition, the template can be matched with T1×T2 samples on any of the 2N×2M sample positions.

On the other hand, for specific approaches of search space constructions as the one described with reference to FIGS. 7 and 8, the memory access window can be defined in terms of maximum number of refinement iterations (search space construction iterations) and iteration step size (in terms of maximum sample distance achievable in each iteration), which can be later converted to maximum amount of displacement in left, right, up and down. Therefore the memory access window is defined as the maximum displacement in each direction. For instance, the 4 iterations in which each iteration may advance the search space in maximum one integer sample position result in EXT=4.

In other words, according to this example, the processing circuitry is configured to determine the refinement of the initial motion vector by template matching with the template in a search space which is iteratively extended in a direction given by one (or more) of more best matching positions of the search space in a most recent iteration, the window is defined by a predefined maximum number of the iterations.

It is noted that in general, the present disclosure is not limited to any particular shape or form or kind of determination of the search space. In another example, search space is a rectangular sub-window of the window or may be equal to the window. The definition of the memory access window may be relevant in order to possibly include the corresponding signaling parameter into the bitstream (for instance parameter EXT or parameters N and M). However, the memory access window size may also be defined in the standard or derivable on the basis of other coding parameters (such as template size, prediction block size, image resolution, etc.). As already noted above, the template matching is not necessarily performed in a rectangular search space including all positions. In an alternative embodiment, the template matching performed for a search space of which the sample positions are determined in a plurality of steps (iteratively) including the steps of: determining an integer search space consisting of sample positions spaced by integer sample step from each other, performing template matching in the integer search space to obtain a best matching integer position, based on the best matching integer position, determining a fractional search space with at least one sample spaced by less than integer sample step from the closest integer search space sample positions, and performing template matching in the fractional search space to obtain a best matching position. In other words, the search space which may be in the beginning and possibly several iterations limited to samples in integer distance from each other in rows and columns, may further develop by adding some fractional positions.

A search space construction which is performed iteratively according to the cost function and also includes fractional position enables reduction of the number of template matching operations to be performed to find the motion vector refinement. Moreover, it may still increase the accuracy by providing also fractional positions to be checked.

For example, the rounding may be obtained as an integer sample position closest to the fractional position to which the initial motion vector points. If there are more than one integer sample position equally close to the fractional position, the rounding is obtained as an integer sample position in a predefined direction, the predefined direction or combination of directions, which may be left, right, top or bottom. As explained above, a fractional position in an integer sample search space can have either two or four closest neighbors. The predefined direction may be specified by ordering the four possible directions in a preferred order so that among two directions of the two equally distanced respective integer samples the one is selected which is listed as first of them in the predefined ordering. A combination of directions is relevant, if the fractional position is not on line with the integer samples but rather shifter in horizontal as well as vertical direction. In such case, the fractional position has to be rounded to an integer position in both directions such as top left or top right or the like.

However, the present disclosure is not limited to a single rounding possibility. Alternatively, if there are more than one integer sample positions equally close to the fractional position, the search space is a unity of a search space located on the more than one integer sample positions equally close to the fractional position. In other words, the search space is a combination of search spaces obtained by respective shifting to all (two or four) equally close integer sample positions. In practice this will result, for instance in one additional column and/or row in the resulting search space as compared to the case where only single shift is performed for two equally spaced integer positions.

Another alternative rounding rule that can be applied might be to choose the sample coordinate that is closest to the (0,0) center coordinate. The center coordinate is in general the coordinate from which the initial motion vector starts. Typically, it would be the position of the collocated block, i.e. a coding block in the reference picture corresponding to the position of the prediction block for which the predictor is to be determined in the current frame. Accordingly if the initial motion vector is equally close to more than one integer sample coordinates, the initial motion vector is rounded to achieve a resulting rounded motion vector with minimum absolute magnitude along both x- and y-axes.

Figure 12:
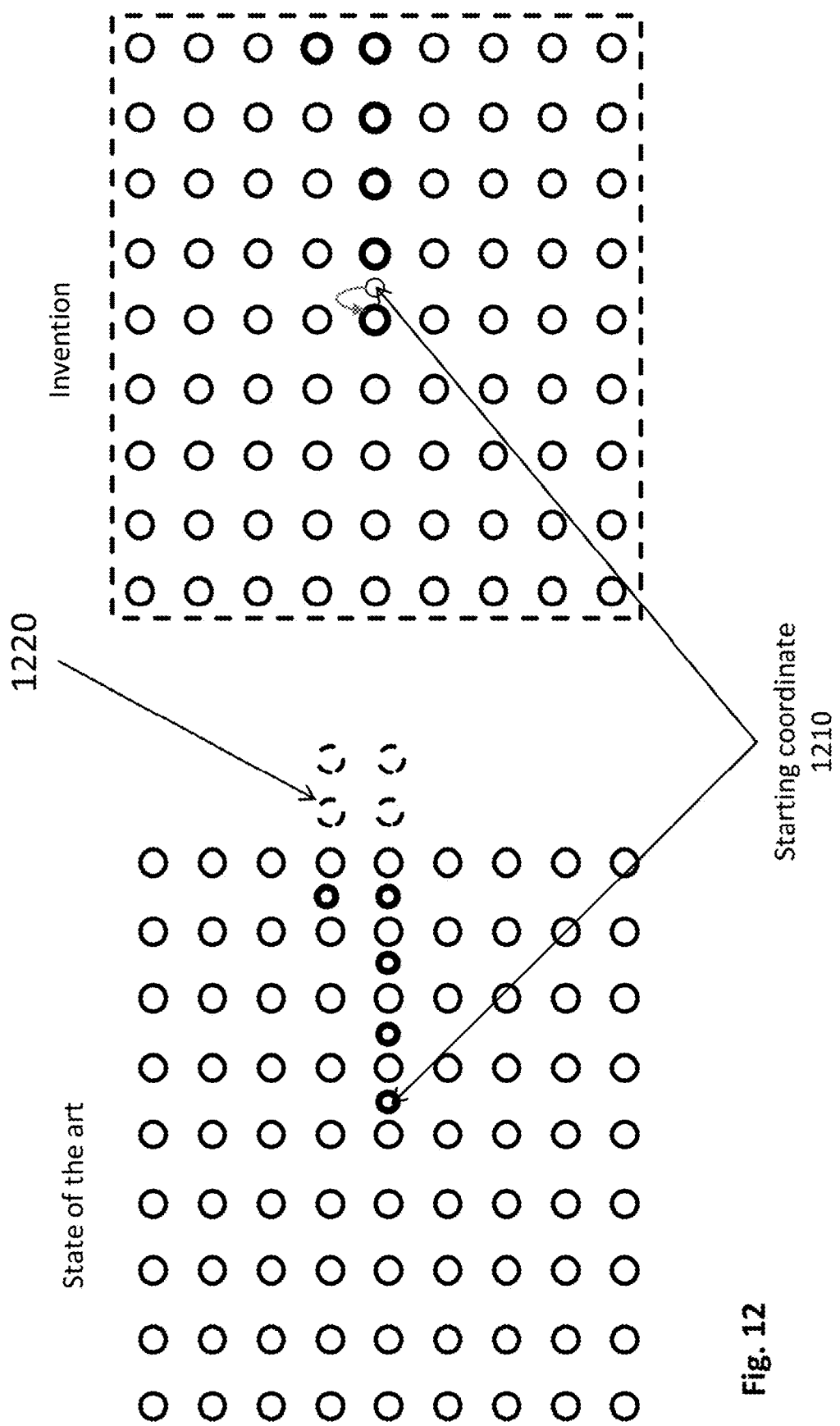
FIG. 12 is a schematic drawing illustrating comparison between the search space obtained without and with rounding of the initial motion vector coordinates.

FIG. 12 shows on the left hand side a typical approach in which the initial motion vector position points to a position (starting coordinate of the motion vector) 1210 which is fractional. The motion vector refinement process is usually applied using fixed step sizes (distance difference between search points). Typically, the distance is integer sample distance, i.e. corresponding to a distance between two integer samples. This means that if the starting point of the search operation is a fractional pel-point, then consecutive search points are also fractional-pel points which is illustrated in FIG. 12 by several fractional positions (smaller bold circles). In the example of FIG. 12, not all fractional positions are shown, in principle, if the search space is defined as a rectangle around the initial motion vector, there would be a fractional position corresponding to each of the grid of the integer samples shown in FIG. 12. As can be seen from the figure, interpolation of the fractional positions may require values of sample positions 1220 out of the search space. For instance, if 6-tap filter is used, two more columns on the right side of the search space would be necessary. If the memory access window is considers to be the same as search space as in this example, this would require additional memory access to fetch the additional samples or a larger storage to internally store two more columns of samples. It is noted that in general, the search space and the memory access window are not the same. FIG. 12 is a simplified example, in which the template is assumed to have size 1×1. In general, the search space would be smaller than the memory access window. The memory access window would additionally include positions which do not belong to search space positions but are used for template matching. The number of additional pixels would depend on the template size. Moreover, the fractional interpolation would only need additional sample positions compared to the template matching, if the interpolation filter size divided by two was larger than template size. However, it is noted that the rounding of the initial motion vector does not only provide the advantage of reducing the window size in such cases. In addition, it also reduces the number of operations which are necessary to interpolate the fractional positions to obtain the search space.

On the right hand side in FIG. 12, the shifting (rounding) of the fractional position 1210 to an integer position is shown. As a result, the search space constructed based on the integer position corresponding to the rounded fractional position includes integer samples and does not require any additional fractional position interpolation in this example.

In other words, in the state of the art since the starting point is a half pel position and since the step size of refinement search step is typically 1 pixel (sample), always fractional positions are searched. As a result, since interpolation filtering requires samples outside of the search space/memory window from the right, the worst case memory access is high. According to an embodiment of the disclosure first the starting coordinate is rounded to an integer starting point. As a result no sample outside of the memory access window need to be accessed even if the search coordinate is at the border (still inside) of the memory access window.

The main benefit of the fractional initial motion position is that given a predefined memory access window the rounding helps the search operation reach a farther point than the initial starting point (since the integer search coordinates do not require interpolation filtering hence additional samples. According to a different viewpoint, if the same number of refinement iterations are applied, the memory access requirement of the disclosure is smaller than the state-of-the-art.

It is noted that the above examples were provided for half-pel interpolation. However, the present disclosure is not limited thereto. In general, any fractional position such as ¼, ⅛, or the like may be used, i.e. interpolated using the corresponding interpolation filter.

The processing circuitry described with reference to FIG. 6 may be employed in an encoder and/or decoder as shown in FIGS. 1 and 2.

In particular, an encoding apparatus may be provided for encoding video images split to prediction blocks into a bitstream, the encoding apparatus comprising: the apparatus for determination of a motion vector for a prediction block as described above including the processing circuitry; and an encoding circuitry for encoding difference between the prediction block and the predictor given by a prediction block in a position specified by the determined motion vector and for generating bitstream including the encoded difference and the initial motion vector.

Further units and functions of the encoder described above with reference to FIG. 1 may also be provided or implemented in the processing circuitry.

Correspondingly, a decoding apparatus may be provided for decoding from a bitstream video images split to prediction blocks, the decoding apparatus comprising: a parsing unit for parsing from the bitstream an initial motion vector and an encoded difference between a prediction block and a predictor given by a prediction block in a position specified by a refined motion vector; the apparatus for determination of the refined motion vector for the prediction block as described above including the processing circuitry; and a decoding circuitry for reconstructing the prediction block as a sum of the parsed difference and the predictor given by the prediction block in the position based on by the refined motion vector. For example, the predictor may be directly given by the position of the refined motion vector. However, there may be further processing steps of obtaining the motion vector of the current prediction block which may further change the motion vector (such as filtering, clipping, further refinement or the like).

Further units and functions of the decoder described above with reference to FIG. 2 may also be provided or implemented in the processing circuitry.

Moreover, the embodiments of the disclosure were described from the point of view of the apparatus with the processing circuitry to perform the motion vector refinement. However, the present disclosure is not limited thereto but also provides the corresponding methods which include the processing steps corresponding to those for the performing of which the above described processing circuitry is configured.

The taps corresponds to the filter coefficients. The tap-size corresponds to filter order. Here, it is assumed that the filter is a linear filter. In some examples, the filter may be symmetric, i.e. having symmetric coefficients. However, the present disclosure is not limited to symmetric filters or linear filters or any kind of filters. In general, the fractional positions may be obtained in any way based on the adjacent samples.

Figure 13C:
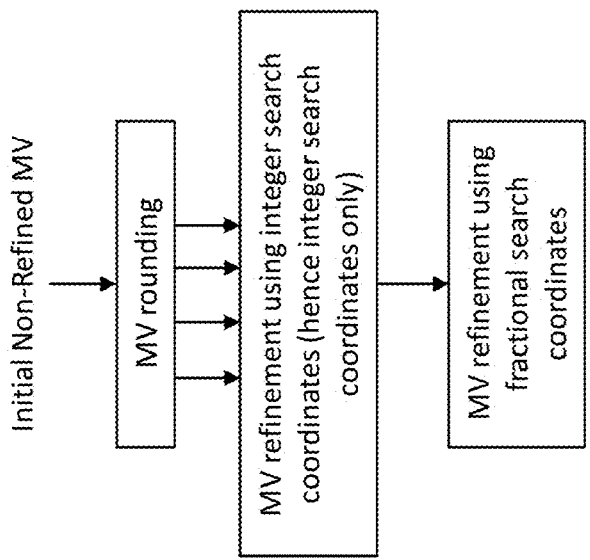
FIG. 13C is a flow diagram illustrating motion vector refinement without rounding of the initial motion vector to a plurality of integer positions.
Figure 13B:
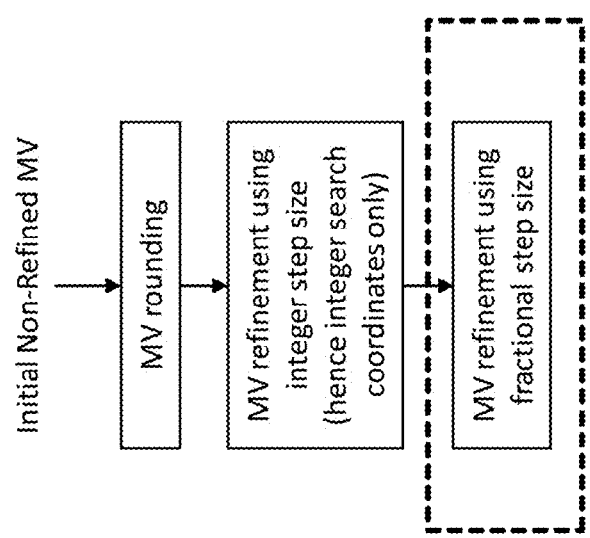
FIG. 13B is a flow diagram illustrating motion vector refinement with rounding of the initial motion vector to a predetermined integer position.
Figure 13A:
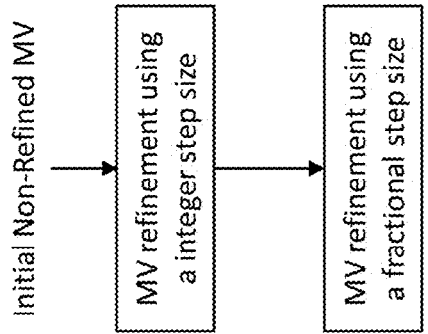
FIG. 13A is a flow diagram illustrating motion vector refinement without rounding of the initial motion vector.

FIG. 13A illustrates a typical approach in which the initial motion vector is input to the motion vector refinement. Then a search space is determined with positions located in integer sample distance from the initial motion vector and the search is performed therein. This results in a search space with only fractional positions which are all to be interpolated in case the initial motion vector has a fractional coordinate. Additionally, some fractional-distance samples may be added to the search space and also tested by the template matching to find the best match for the prediction block.

FIG. 13B illustrates an approach according to the present disclosure. In particular, an initial (non-refined) motion vector is input to the motion vector refinement procedure. If the position to which the initial motion vector points (i.e. at least one the motion vector coordinate) is fractional, then the position (the fractional one or both coordinate(s)) is rounded to the next closest integer position. The search space is then determined as in case or FIG. 13A. However, due to the rounding, the search space is forms by integer positions.

After the integer-distance search a finer, fractional-distance search may be performed around the motion vector refinement in the integer-distance search space. The present disclosure does not disallow a later motion vector refinement search based on fractional search coordinates, given that the defined memory access window is not exceeded (due to additional interpolation operation). Usually the refinement operation is applied in progressively smaller step sizes, once the integer step size search is complete, finer step sizes might also be checked. As a special case, the Initial Non-Refined MV might always be checked and compared with the remaining search coordinates, since it is a candidate coordinate that was selected as the best motion vector by a previous operation.

FIG. 13C illustrates an alternative approach in which the rounding is performed in different ways resulting in different overlapping search spaces. In particular, More than one rounding alternative can be generated by the motion vector rounding step, especially if there are more than one closest integer sample position. Accordingly in order to reduce the memory access the starting search point is rounded to an integer-pel point (more generally to a position whose reconstruction requires less pixel extension) or more integer-pel points (typically 2 or 4). Therefore the subsequent search points are also integer pel points.

In the above embodiments and examples, by shifting a fractional motion vector position to an integer position, a search space may be constructed which mainly includes integer samples. However, still, such shifted search space based on the rounded initial motion vector rather than fractional motion vector, may include some fractional positions. For example, if the search space is determined iteratively as illustrated with reference to FIG. 8, then in a last iteration, one or more fractional positions may be tested. However, this is only an example and the fractional positions may be tested in any iteration. In order to avoid that fractional positions require a repeated access to the memory to fetch additional samples which may be necessary for fractional interpolation, in the following, two further embodiments are described, namely:

Limiting the memory access window and only enabling fractional positions in the search space template matching operation, which do not require extension of the window, wherein the memory access window is defined in order to enable accessing any samples necessary for template matching for a certain prediction block Padding samples which extend over a memory access window with some predetermined replacement values depending on the samples within the window.

These embodiments will be described in detail in the following. In particular, the processing circuitry may be further configured accordingly, in order to maintain the memory access window and number of its accesses low. The corresponding methods and apparatuses are provided.

Limited Memory Access Window for Interpolation Filtering

As mentioned above, the external memory access is one of the most important design considerations in today's hardware and software architectures. Motion vector estimation especially when including template matching, for instance in case of motion vector refinement, may also be used with interpolation filtering to obtain fractional positions of the search space. Use of the interpolation filtering may require increase of the number of samples which need to be accessed from the memory. However, this may lead to either increase of the expensive on-chip memory or to increased number of external memory accesses, which on the other hand slows down the implementation. Especially at the decoder side, these problems may lead to more expensive or slower applications which is not desirable.

In order to prevent such situation, the present disclosure in another embodiment provides a restriction on external memory accesses. According to an embodiment of the disclosure, a window of samples which are to be accessible for the motion vector refinement is defined around the position pointed to by a non-refined motion vector, i.e. by the initial motion vector. The window defines the maximum number of samples that need to be accessed from the memory in order to perform the motion vector refinement. In general, the samples which are to be accessible include the samples on positions of the search space in which the template matching is to be performed and the samples which are to be matched with the template for all positions in the search space. The latter typically exceed the search space. For simplicity reasons the window of memory access may be defined as an extension around the coding block (current block for which the motion vector is to be found). For example, R samples from left and right and R samples from top and bottom boundary of the current block may define the window. In other words, when the current block has a size of N×N samples, the access window may have size of (R+N+R)×(R+N+R), i.e. (N+2R)×(N+2R) samples For instance, R may be equal to 4. However, the current block may be of vertical size N different from the horizontal size N and the number of extension samples in top, bottom, left and right direction may also differ.

According to the present disclosure, in order to limit the memory access window, the fractional pixel coordinates are accessed by the motion vector refinement only if samples necessary for the interpolation lie inside the window of memory access for the motion vector refinement as defined for integer samples.

Figure 14:
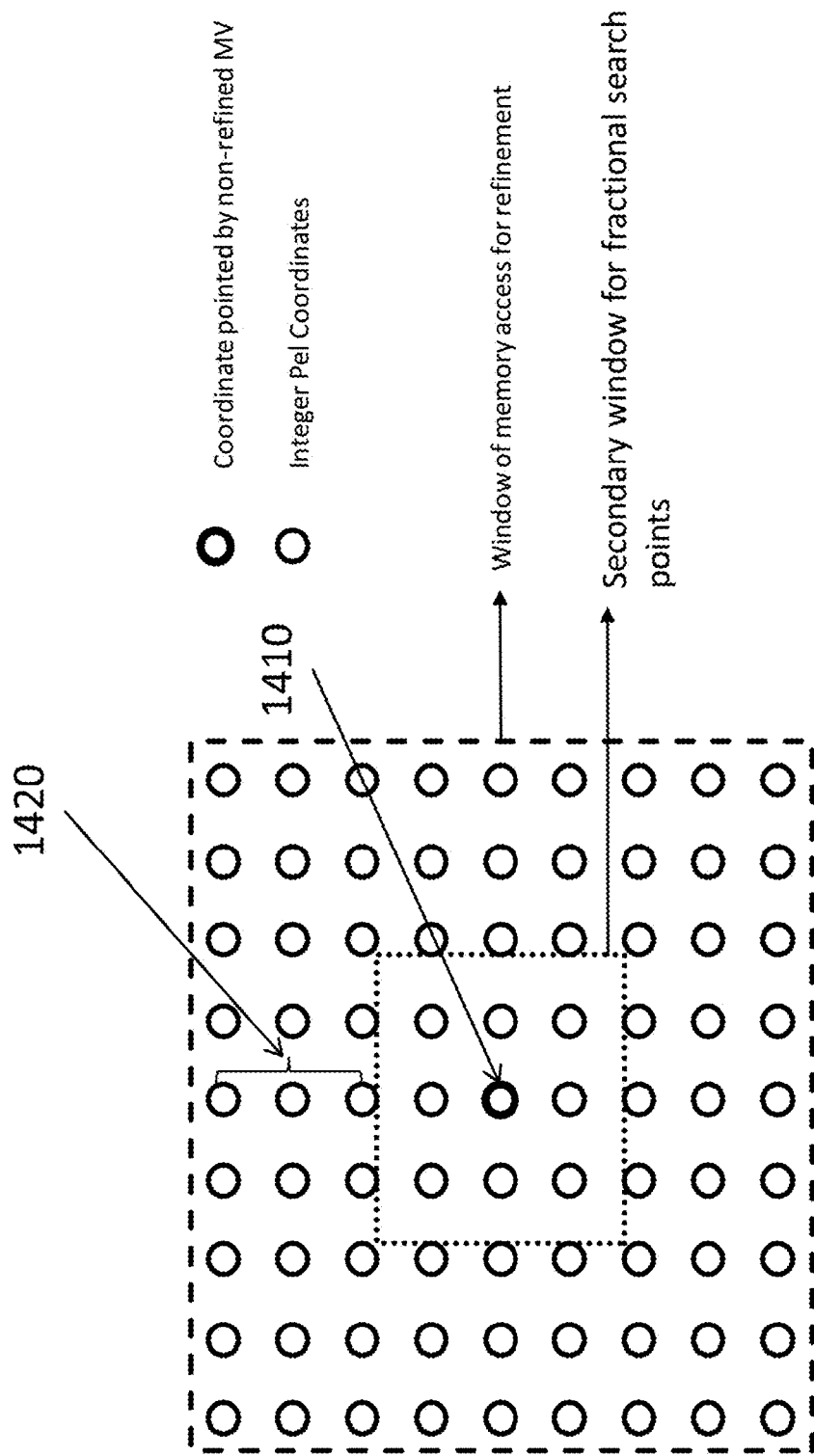
FIG. 14 is a schematic drawing illustrating definition of a sub-window for fractional sample positions.

FIG. 14 shows a window of memory access for motion vector refinement. Center point 1410 is the position pointed to by the non-refined input motion vector (initial motion vector obtained either from the bitstream or by previously performed template matching or testing of the candidates as described above). In order to avoid further increasing of the window size due to adding fractional positions to the search space, motion vector refinement is performed according to following rules:

A) A window of memory access for refinement is defined around the non-refined initial motion vector coordinate (i.e. position pointed to by the initial motion vector). The window identifies the maximum number of pixel samples that need to be accessed from the memory in order to perform motion vector refinement by template matching in a search space.
  1. In this example, for the sake of simplicity, the size of the current block (coding block size) is 1×1 sample, but it can be larger and it typically would be larger.
  2. The window of memory access is defined as the extension around the coding block, such as 4 samples from left/right and 4 samples from top/bottom shown in the figure.

B) The fractional pixel coordinates are accessed for MV refinement only if samples necessary for interpolation lie inside the window of memory access.

Requirement B ensures that the access window defined by the samples necessary for motion vector refinement on integer samples is not further extended. The actual fractional samples accessible according to this rule are given by the size and shape of the interpolation filter. Accordingly, in FIG. 14, assuming an interpolation filter with 6 taps, the dotted line indicates a region in which the fractional samples may be located. However, it is noted that further fractional pixel positions may be allowable as will be shown with reference to FIG. 15. In particular, fractional positions which require only vertical or only horizontal filtering which does not require extension beyond the access window may still be used. Thus, limiting the fractional positions to the fractional sample window shown in FIG. 14 may be too limiting for some applications.

In other words, according to an embodiment, the memory access window includes all samples that are accessible by the motion vector refinement performed on integer samples and do not include samples that are not accessible by motion vector refinement performed on integer samples. Thus, if fractional samples are used for motion vector refinement, they are obtained in a manner which does not require additional samples.

In the example of FIG. 14, this is achieved by only allowing fractional samples which, for a predefined interpolation filter shape and size, do not require samples out of the access window. The dotted fractional sample window extends within the access window. If T is the number of interpolation filter taps, then the fractional sample window border is defined by integer samples in a distance 1420 of floor(T/2)−1 from the access window border samples. In particular, in this example T=6, T/2=3 and the distance from the access window border sample to the fractional window sample is T/2−1=2 integer samples.

However, it is noted that this determination of the fractional window is a mere example. In general, the window may have a different form and size. The vertical and horizontal interpolation may be done by filters with different sizes. Moreover, some fractional positions may require filter in both vertical and horizontal direction which may in general by separable or non-separable.

Alternatively, the interpolation filter could be changed (e.g. number of taps at least in one direction reduced) for the fractional positions outside the dotted window in FIG. 14. However, for implementation purposes and for interpolation quality reasons, such solution may be less attractive.

It is noted that in general, the present disclosure is not limited to any particular shape or form or kind of determination of the search space such as the iterative approach. In another example, search space is a rectangular sub-window of the window such that all integer samples accessed for interpolation filtering of each fractional sample in the sub-window are located within the window for the interpolation filter with the predefined tap-size. A similar example has been already discussed above with reference to FIG. 14. In FIG. 14, the search space is given by the 9×9 integer samples and fractional samples located within the region formed by 5×5 integer samples with the initial motion vector position in their center.

Figure 15:
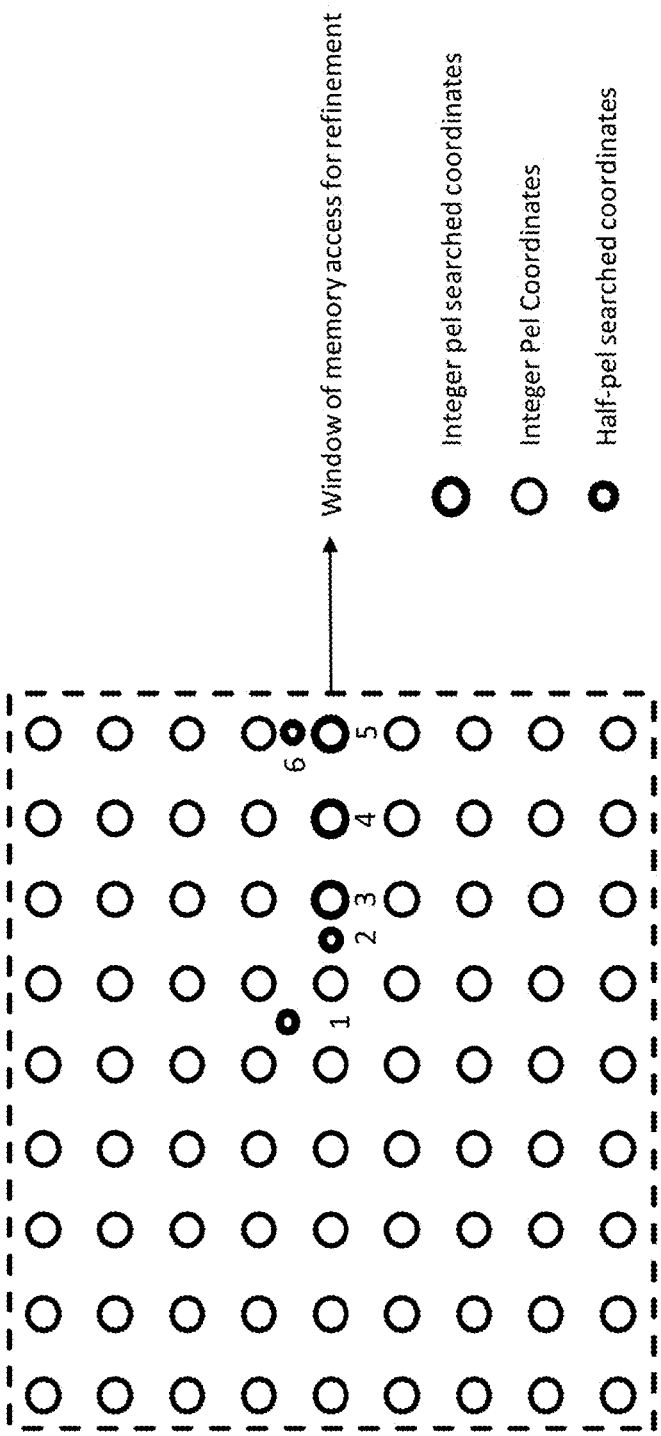
FIG. 15 is a schematic drawing illustrating exemplary positions including fractional positions which are allowed to form search space positions for motion vector refinement.

FIG. 15 illustrates an example with different fractional pixel positions. For this example, it is assumed that the size of the template is 1×1 samples (for simplicity) and 6 tap interpolation filter is used for each half-pel position. In the example, the search coordinates that are searched are denoted by numbers 1-6 which indicate the order they are checked, i.e. the order in which the template matching search is performed. Positions 1 and 2 are half-pel position (meaning that they are located in the middle between two integer sample positions, pel is an abbreviation for pixel and the term pixel is used interchangeably with the term sample in this application). Positions 1 and 2 are checked since the necessary extension for interpolation filtering lies inside the window of memory access (3 integer samples on the diagonal top-left and 3 integer samples bottom-right from position 1; 3 integer samples to the right and 3 integer samples to the left of position 2). Note that fractional sample point 1 requires extension both in horizontal and vertical direction, both of which lie inside the window. Position 2 only requires extension to the right and to the left.

Positions 3, 4 and 5 are integer sample (integer-pel) positions. They can be searched since no extension for interpolation filtering is necessary. Fractional (half-pel) sample 6 can also be accessed since only an extension in the vertical direction (by three integer positions up and down respectively) is necessary which is still inside the window. No extension in the horizontal direction is necessary. Still, in the above implementation fractional sample points are accessed only if necessary interpolation extension is within the memory access window. In other words, according to an example, the interpolation filter is a one-dimensional filter assessing K either horizontal or vertical integer samples when the fractional position is located on a respective horizontal or vertical line of integer samples.

Such one-dimensional fractional positions (e.g. positions 2 and 6 in FIG. 15) located on a line between two horizontally or two vertically adjacent integer positions require an extension for interpolation only in horizontal direction or only in vertical direction, i.e. are to be filtered only by a respective horizontal or vertical interpolation filter. In order to be able to make use of as many fractional positions as possible, in addition to the fractional positions allowed in the example of FIG. 14, it may be advantageous to add further one-dimensional positions such as position 6 shown in FIG. 15.

In other words, the search space further includes fractional positions located outside the fractional sub-window (cf. dotted window of FIG. 14) either:
  adjacent on the top or on the bottom of the sub-window and located on the horizontal line of integer samples or
  adjacent on the left or on the right hand side of the sub-window and located on the vertical line of integer samples.

It is noted that some fractional samples might require more integer samples in a given direction, horizontal or vertical. This may be the case if the predefined filter size is different to generate that position in the respective directions.

Figure 16:
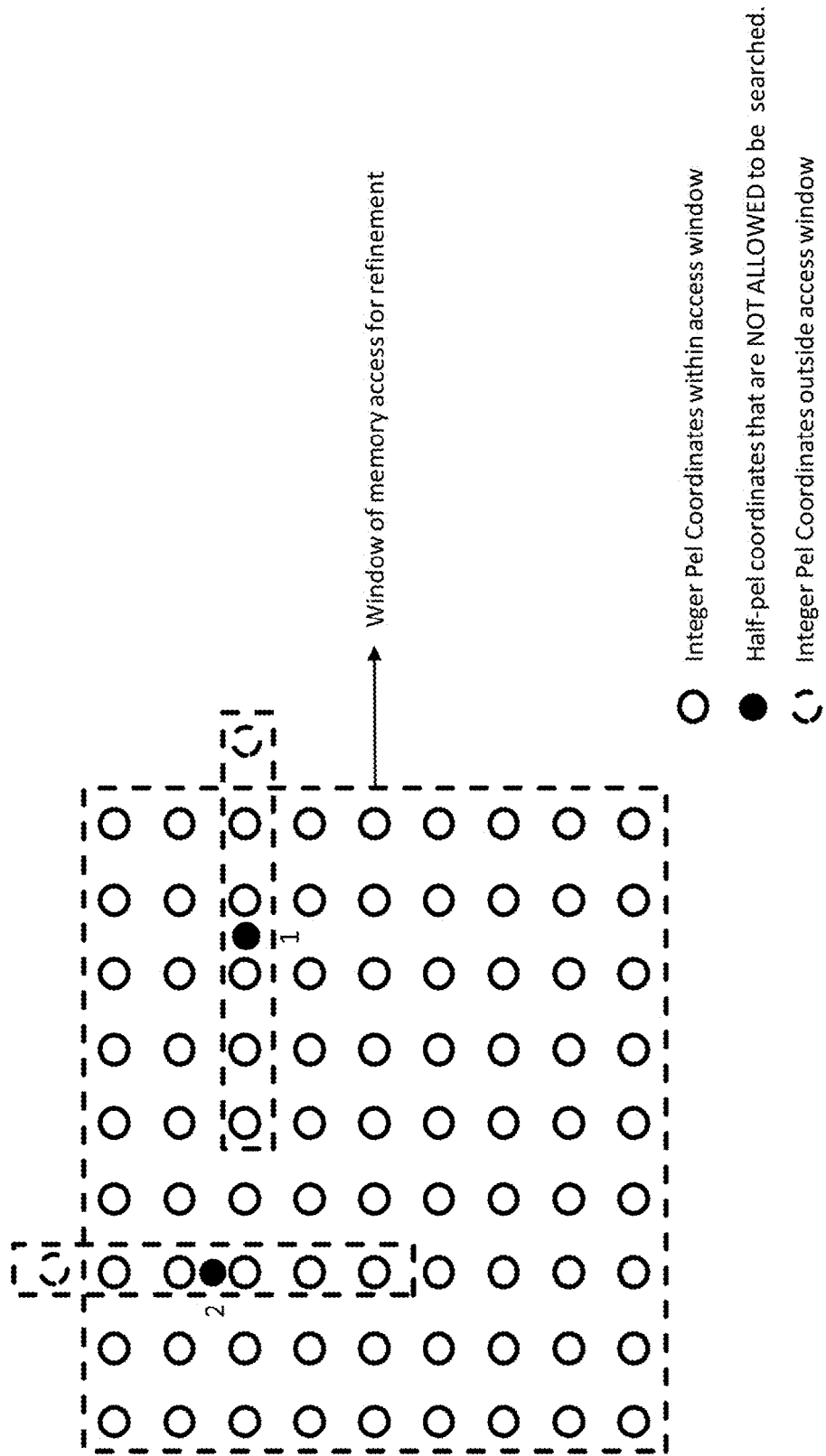
FIG. 16 is a schematic drawing illustrating exemplary fractional positions which are not allowed to form search space positions for motion vector refinement.

FIG. 16 illustrates an example of fractional half-pel positions 1 and 2 which cannot be accessed. They are located outside the sub-window shown in FIG. 14. For this example, it is assumed that 6 tap interpolation filter is used for half pel positions. The half-pel search points 1 and 2 are not allowed to be searched, since horizontal or vertical interpolation filtering requires samples that lie outside of the window. The integer sample positions needed by the horizontal filter to filter position 1 and the vertical filter to filter position 2 are indicated by a dashed line in FIG. 16. As can be seen, dashed circles correspond to the integer positions which are not within the memory access window.

In the above examples, the memory access window was defined so that no sample outside of the window is accessed (even for interpolation filtering) during the motion vector refinement process. In other words memory access window is the smallest window that encloses the samples that might need to be accessed for motion vector refinement and interpolation. Moreover, the memory access window has been designed according to the samples necessary for motion vector refinement based on integer sample positions. Then, only fractional positions are allowed which do not require further extension of such access window by further integer positions. It is noted that the above examples were provided for half-pel interpolation. However, the present disclosure is not limited thereto. In general, any fractional position such as ¼, ⅛, or the like may be used, i.e. interpolated using the corresponding interpolation filter.

Moreover, method is provided for determination of a motion vector for a prediction block including the steps of: obtaining an initial motion vector and a template for the prediction block; determining a refinement of the initial motion vector by template matching with the template in a search space, wherein the search space is located on a position given by the initial motion vector and includes one or more fractional sample positions, wherein each of the fractional sample positions belonging to the search space is obtained by interpolation filtering with a filter of a predefined tap-size assessing integer samples only within a window, the window being formed by integer samples accessible for the template matching in the search space. The taps corresponds to the filter coefficients. The tap-size corresponds to filter order. Here, it is assumed that the filter is a linear filter. In some examples, the filter may be symmetric, i.e. having symmetric coefficients. However, the present disclosure is not limited to symmetric filters or linear filters or any kind of filters. In general, the fractional positions may be obtained in any way based on the adjacent samples.

Figure 17:
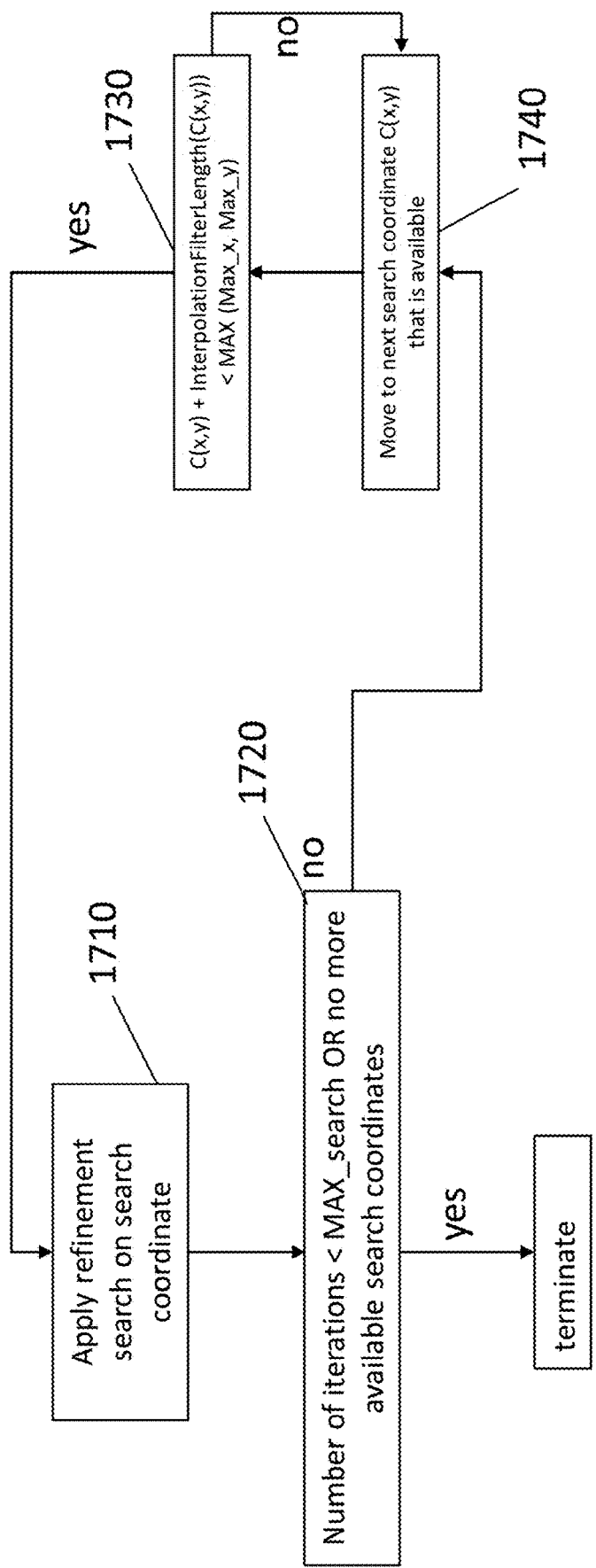
FIG. 17 is a flow diagram illustrating method for determining which position of a search space are allowed to be tested by template matching for motion vector refinement

FIG. 17 shows an exemplary implementation of a method according to an embodiment. A function InterpolationFilterLength(C) returns the number of additional samples necessary in the horizontal and vertical directions in order to apply interpolation filtering. The number of necessary samples changes depending on:

Whether the search coordinate is integer pel, half pel, or quarter pel position.

Whether horizontal, vertical or both of the interpolation filters need to be applied to generate the search coordinate sample.

The method starts in step 1730. In particular, the initial motion vector position is the first search space position C(x,y) to be tested. The function InterpolationFilterLength (C) returns for this position the number of samples in the horizontal and vertical directions in order to apply interpolation filtering. If the sum of C(x,y) and InterpolationFilterLength(C(x,y)) exceeds the access window size defined by MAX (max_x, max_y), then the position is not used as a part of the search space. Instead, next search coordinate C(x,y) is selected in step 1740 to be tested (for instance, x or y or both are incremented, depending on the order in which the search is performed). If the tested position in step 1730 does not require exceeding the access window, the in step 1710 the template matching as a part of the motion vector refinement is performed for that position C(x,y). Then it is tested in step 1720, whether there are still search space positions left for template matching. If not, the refinement is terminated. If yes, the next coordinate is selected in the step 1740 and the condition of step 1730 is evaluated for that new position. These steps are repeated.

As already described above, alternative possibilities exist to define the allowed fractional positions (such as the window in FIG. 14, possibly extended by further fractional samples as shown in FIG. 15). Based thereon, a simpler condition may be formulated in step 1730 merely evaluating whether the position C(x,y) belongs to the allowed window.

In other words, this embodiment is based on observation that motion vector refinement when implemented in combination with fractional interpolation may require further increase of on-chip memory size or even external memory access. Both options may be undesirable.

In view of the above mentioned problem, the embodiment provides motion vector prediction which enables to take into account the number of accesses to the external memory and the number of samples which are necessary to be accessible for motion vector refinement of a motion vector for a coding block.

This is achieved by limiting the number of samples to those necessary for the integer sample template matching and only enabling those fractional positions which are obtainable with a predetermined interpolation filter without requiring additional integer samples.

According to an aspect of the disclosure, an apparatus is provided for determination of a motion vector for a prediction block including a processing circuitry configured to: obtain an initial motion vector and a template for the prediction block; and determine a refinement of the initial motion vector by template matching with the template in a search space. The search space is located on a position given by the initial motion vector and includes one or more fractional sample positions, wherein each of the fractional sample positions belonging to the search space is obtained by interpolation filtering with a filter of a predefined tap-size assessing integer samples only within a window, the window being formed by integer samples accessible for the template matching in the search space.

One of the advantages of such motion vector determination is limited number of samples which need to be accessible for performing the motion vector refinement for a prediction block while at the same time limiting the number of accesses to the external memory or generally to a memory/storage/cache storing the entire reference pictures.

In an example, the window is defined as N integer sample columns and M integer sample rows relative to the prediction block initial motion vector, N and M being non-zero integer values. Such definition may provide a simple means for specifying which samples are to be retrieved for the purpose of motion vector determination and/or refinement. It may also be easily configurable for instance within a bitstream or standard.

In one embodiment, the processing circuitry is configured to determine the refinement of the initial motion vector by template matching with the template in a search space which is iteratively extended in a direction given by one of more best matching positions of the search space in a most recent iteration, and the window is defined by a predefined maximum number of the iterations.

The search space may include a rectangular sub-window of the window such that all integer samples accessed for interpolation filtering of each fractional sample in the sub-window are located within the window for the interpolation filter with the predefined tap-size.

In particular, as a specific example, the interpolation filter is a one-dimensional filter assessing K either horizontal or vertical integer samples when the fractional position is located on a respective horizontal or vertical line of integer samples.

Moreover, for instance, the search space further includes fractional positions located outside the sub-window either:

adjacent on the top or on the bottom of the sub-window and located on the horizontal line of integer samples or adjacent on the left or on the right hand side of the sub-window and located on the vertical line of integer samples.

According to another aspect of the disclosure, an encoding apparatus is provided for encoding video images split to prediction blocks into a bitstream, the encoding apparatus comprising: the apparatus for determination of a motion vector for a prediction block as described above; and an encoding circuitry for encoding difference between the prediction block and the predictor given by a prediction block in a position based on the determined motion vector and for generating bitstream including the encoded difference and the initial motion vector.

According to another aspect of the disclosure a decoding apparatus is provided for decoding from a bitstream video images split to prediction blocks, the decoding apparatus comprising: a parsing unit for parsing from the bitstream an initial motion vector and an encoded difference between a prediction block and a predictor given by a prediction block in a position specified by a refined motion vector; the apparatus for determination of the refined motion vector for the prediction block as described above; as well as a decoding circuitry for reconstructing the prediction block as a function of the parsed difference and the predictor given by the prediction block in the position specified by the refined motion vector. The function may be or include a sum. The function may further comprise clipping, rounding, scaling or further operations.

According to another aspect of the disclosure a method is provided for determination of a motion vector for a prediction block including the steps of: obtaining an initial motion vector and a template for the prediction block; determining a refinement of the initial motion vector by template matching with the template in a search space, wherein the search space is located on a position given by the initial motion vector and includes one or more fractional sample positions, wherein each of the fractional sample positions belonging to the search space is obtained by interpolation filtering with a filter of a predefined tap-size assessing integer samples only within a window, the window being formed by integer samples accessible for the template matching in the search space.

For instance, the window is defined a as N integer sample columns and M integer sample rows relative to the prediction block initial motion vector, N and M being non-zero integer values.

In an embodiment, the refinement of the initial motion vector is determined by template matching with the template in a search space which is iteratively extended in a direction given by one of more best matching positions of the search space in a most recent iteration, the window is defined by a predefined maximum number of the iterations.

In an exemplary implementation, the search space includes a rectangular sub-window of the window such that all integer samples accessed for interpolation filtering of each fractional sample in the sub-window are located within the window for the interpolation filter with the predefined tap-size.

Moreover, for instance, the interpolation filter is a one-dimensional filter assessing K either horizontal or vertical integer samples when the fractional position is located on a respective horizontal or vertical line of integer samples.

Advantageously, the search space further includes fractional positions located outside the sub-window either: adjacent on the top or on the bottom of the sub-window and located on the horizontal line of integer samples or adjacent on the left or on the right hand side of the sub-window and located on the vertical line of integer samples.

Padding

Alternatively to the limiting of the fractional positions in the search space based on the memory access window, the present disclosure performs in its another embodiment padding of the samples which are located outside the memory access window if these are needed, for instance, to interpolate fractional samples.

The provision of replacement samples (padding samples) may be further advantageous in connection with template matching on search spaces which also include fractional samples. In other words, the search space for a prediction block may include at least one fractional sample position with a value obtained by interpolation filtering with a filter of a predefined tap-size. The interpolation filtering uses sample position values from the window and the at least one replacement value to obtain the at least one fractional sample position value.

Figure 18:
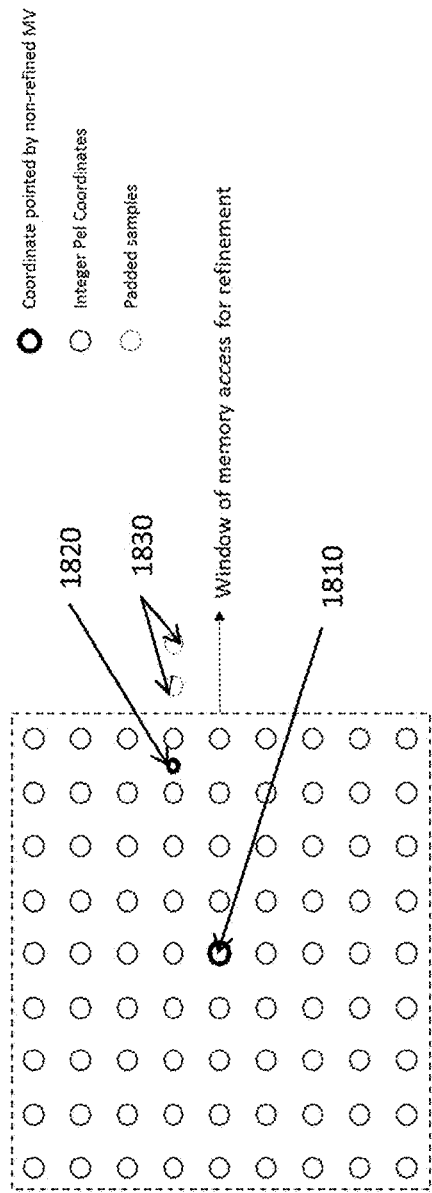
FIG. 18 is a schematic drawing illustrating padding of two samples to enable fractional position calculation.

FIG. 18 shows a window of memory access for the purpose of motion vector refinement The window is spanned around the point 1810 in the center which is the position pointed to by the initial motion vector. Moreover, fractional position 1820 also belongs to the search space. However, the fractional position 1820 is to be interpolated by a 6 tap filter using 3 integer sample positions to the left of the fractional position and three integer sample positions to the right of the fractional position. Since the fractional position 1820 is located on a line with the integer sample positions, a one-dimensional filter may be applied for interpolation, for instance one as shown in the above example described with reference to FIG. 9. As can be seen in FIG. 18, in order to interpolate the fractional sample 1820 two further sample positions 1830 would be necessary which are located out of the window. In order to avoid additional loading of these samples from the external memory, according to the present disclosure, the values of the window-extern positions 1830 are replaced with values which are obtained on the basis of the samples within the window.

FIG. 18 illustrates fractional sample position 1820 which is in the middle between two integer sample positions and thus a half-pixel (half-pel) position. However, the present disclosure can equally be applied to other fractional positions such as quarter or ⅛ positions. Moreover, sample position 1820 is located on a horizontal line corresponding to a row of the integer sample positions so that horizontal 1D filtering can be used for its interpolation. However, the present disclosure is not limited to such fractional positions. Rather, fractional positions may be located on a vertical line corresponding to a column of the integer sample positions so that vertical 1D filtering can be used for its interpolation. Moreover, the fractional positions do not have to be located on the same line of pixels as the integer samples at all. In such case, two-dimensional filtering may be used to interpolate such samples; such 2D filtering may be separable to vertical and horizontal 1D filtering.

Examples of various fractional positions are shown in FIG. 15. In particular, fractional position 1 is a position for the interpolation of which both horizontal and vertical filtering may be applied because it is not located on line with the rows and columns of the integer sample positions. Position 2 is a position for the interpolation of which only horizontal filtering is used whereas position 6 is a position for the interpolation of which only vertical filtering is used. All fractional positions shown in FIG. 15 can be obtained using only the integer positions within the window.

Returning to FIG. 18, according to an embodiment, a window of memory access for refinement is defined around position pointed to by the non-refined motion vector 1810. The window identifies the maximum number of pixel samples that need to be accessed from the memory in order to perform motion vector refinement search. The search space here correspond to the access window. In other words, for the sake of simplicity, in this example the template size is considered 1×1, but it can and in praxis would typically be larger. The window of memory access is usually defined as the extension around the coding block. In this example, it is 4 samples from left/right and 4 samples from top/bottom.

If search space position currently tested during template matching requires samples from outside of the window of memory access, then samples necessary for reconstruction of the coding block are obtained by padding. This is the case in FIG. 18 for the fractional position 1820. If the template matching is to be performed on this position or using this position, it has to be interpolated using additional padded positions 1830 located outside the window.

Padding samples can be generated, for instance, using one of the methods of:

Nearest sample replication.

Mirroring along the axis of interpolation filtering.

In particular, the nearest sample replication refers to an approach in which the replacement value is determined to be equal to the value on a closest of the accessed integer sample positions. For instance, in FIG. 18, the two missing position values 1830 would be replaced with the value of the sample immediately adjacent to the right of the fractional position 1820 to be interpolated. However, it is noted that this approach is only an example and the present disclosure is not limited to a mere replication of the neighbor. Alternatively, several nearest sample positions may be used to interpolate the missing samples 1830. For example, three samples on the boundary nearest to the missing sample may be used to interpolate the missing sample for instance by weighted averaging with weights set inverse proportional to the distance of the three samples from the missing sample.

The mirroring refers to an approach according to which the replacement value is determined by mirroring with respect to the axis of the interpolation filter the value of the corresponding assessed integer sample position. For example in FIG. 18, the two missing samples 1830 would be replaced with the values of samples to the left of the fractional position 1820. In particular, the second sample to the right of the fractional position 1820 is replaced with the value of the position second to the left of the fractional position 1820, whereas the third sample to the right of the fractional position 1820 is replaced with the value of the position third to the left of the fractional position 1820.

It is noted that a combination of the two above mentioned approaches may also be applied in which the missing samples are a function of the mirrored samples and the nearest sample.

According to an embodiment, the window is formed by all integer sample positions accessible for the template matching on integer sample positions within the search space. This is for instance the case for the example of FIG. 18, in which the additional samples outside the window are only necessary for the template matching in non-integer, fractional sample positions. In other words, in FIG. 18, in the above example the half pel coordinate that is to be searched require sample outside of the memory access window. As a result padding operation is applied to generate the unavailable samples. However, the present disclosure is not limited thereto.

Figure 19:
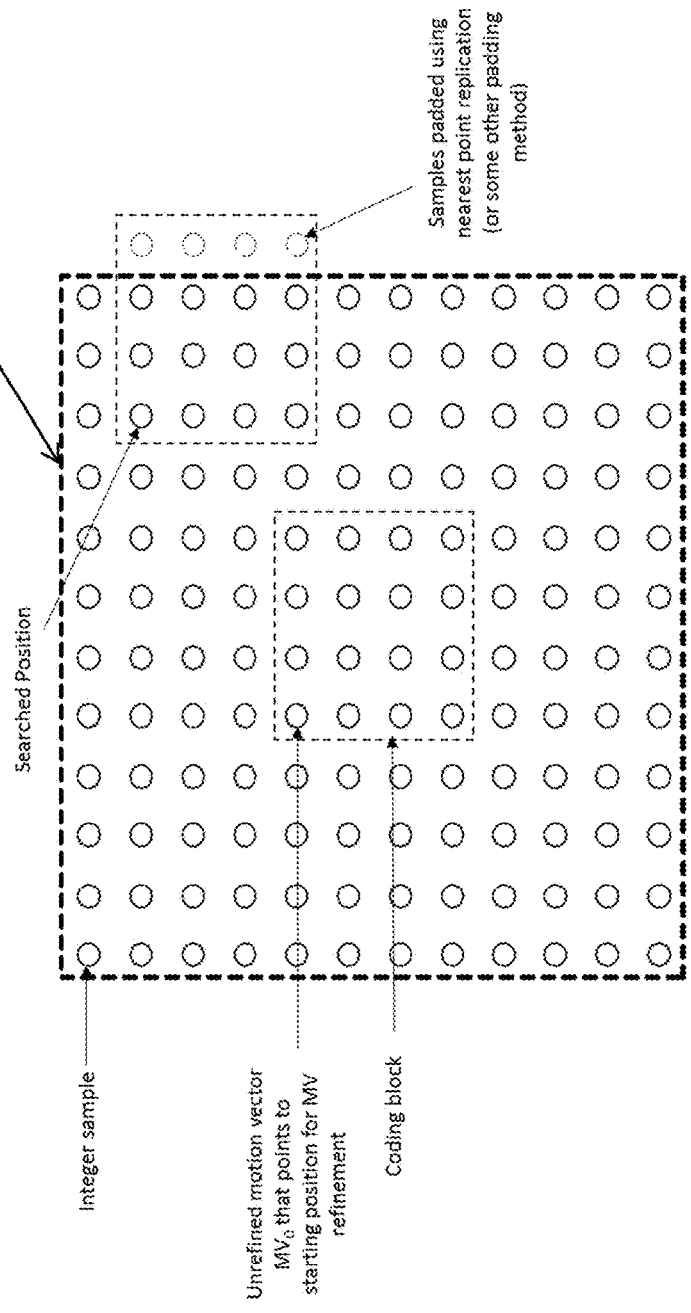
FIG. 19 is a schematic drawing illustrating padding of four samples to enable template matching on the search space boundaries.

FIG. 19 shows an alternative approach in which the window does not include all integer sample positions accessible for the template matching on integer sample positions within the search space. In the previous examples the coding block size was depicted as 1×1 for simplicity. In FIG. 19 the size is 4×4 integer samples. In this example, if the search coordinate (position on which template match is to be calculated) points to in integer sample, padding can still be applied if some of the samples in the block lies outside of the memory access window. This approach enables to limit the window size even more.

In detail: FIG. 19 shows window 1920 which includes some of the accessible samples the initial motion vector points to a position which marks top left corner of a coding block. The search space may be considered here as equal to the window. However, it is noted that it can be in general smaller than the window which also may make sense since if the template is larger than 1×1 integer samples, then necessarily samples apart from those included in the search space will be necessary to perform the template matching. Nevertheless, if the search space defines the size of the window, alternatively, the missing samples may be padded. In FIG. 19 the exemplary search position in the second row and $10^{th}$ column of the window is shown. Template matching with a 4×4 integer sample large template requires also pixels outside the window. These samples are thus padded, i.e. replaced by values determined or calculated on the basis of the samples within the window. The above mentioned padding approaches such as nearest neighbor or mirroring may be applied.

The window may be defined by its vertical and/or horizontal size with respect to the search space, or a block with a size of the prediction block located on the initial motion vector position, or the initial motion vector position.

An example of window definition is shown in FIG. 11 and described above. This corresponds to determining of the window size based on the size of the prediction block located on the initial motion vector position. Alternatively, the window size may be defined with respect to the initial vector position by the size in one or both of x and y directions. For instance, the window may be defined to be located around the position pointed to by the initial motion vector and extending A integer samples to each of up, down, left, right direction. Alternatively, it may extend A integer samples to the left and right respectively and B integer samples up and down respectively. Further definitions are possible.

Figure 20:
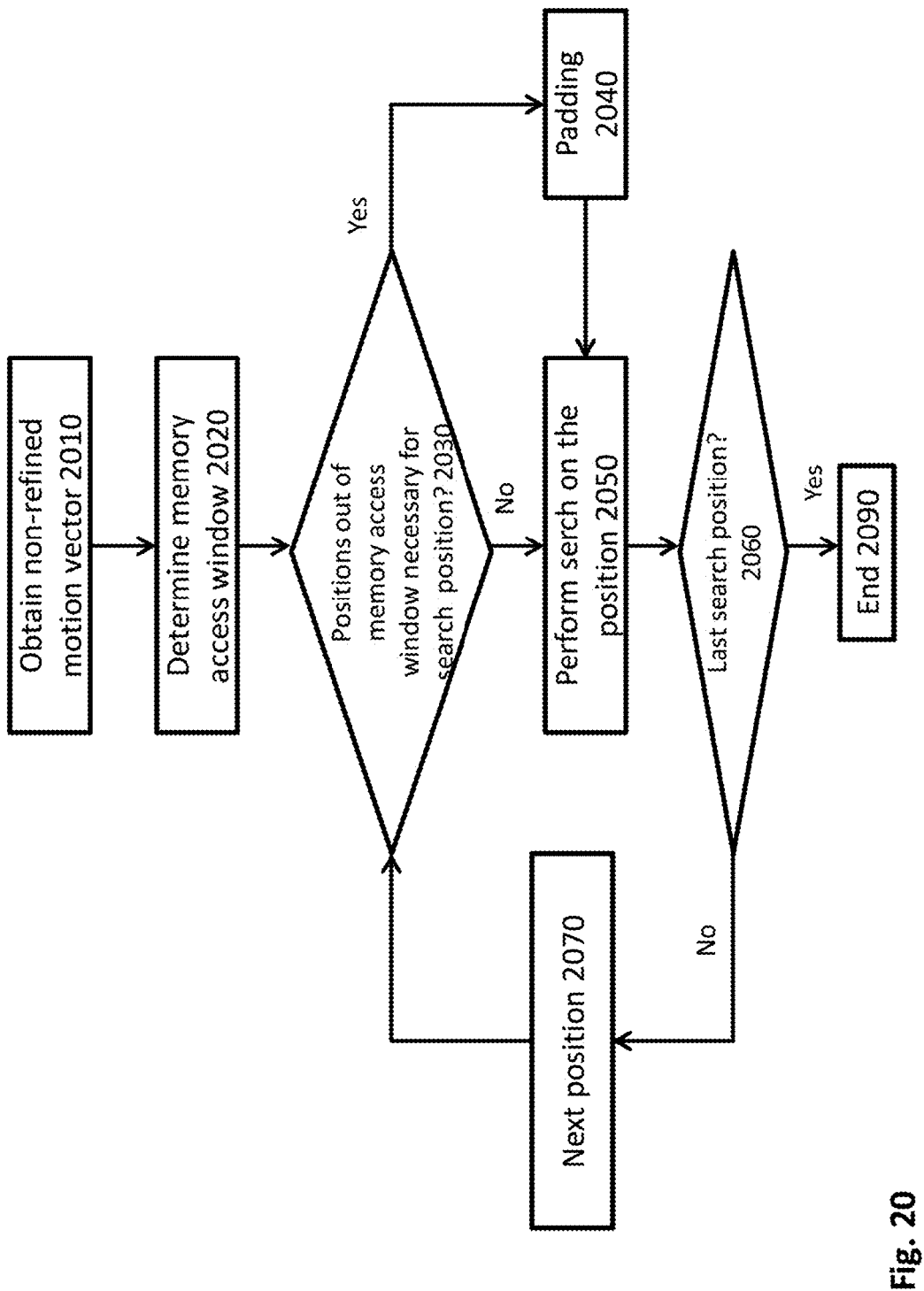
FIG. 20 is a flow chart of a method applying sample padding.

A method according to an embodiment determines a motion vector for a prediction block with the following steps illustrated in FIG. 20. In step 2010 an initial motion vector and a template for the prediction block is obtained, followed by determining a refinement of the initial motion vector by template matching with the template in a search space. The search space is located on a position given by the initial motion vector. The memory access window is determined in 2020. It is noted that this does not have to be performed explicitly. The memory access window may be predefined and known. Thus this step is for illustration to indicate that the knowledge of the memory access window size is known. Then the template matching is performed in steps 2030-2090.

The template matching accesses integer sample positions within a predetermined window, the predetermined window including the search space and further integer sample positions accessible for the template matching; and replaces at least one integer sample position located out of the window by a replacement value which is based on at least one sample within the window. The accessed integer sample position values as well as the replacement values are used to perform the template matching. This is shown in FIG. 20: The template matching is performed for all positions in the search space. In step 2030 it is tested whether the template matching on the current position requires a sample or samples which is/are out of the memory access window. If affirmative (yes in step 2030), then the padding as described above is performed for the sample or samples out of the window in step 2040. After this step, the template matching (i.e. search) is performed in step 2050 at the current position using the padded samples. Alternatively, if none of the necessary samples is out of the window (No in step 2030), the template matching (i.e. search) is performed in step 2050 at the current position using the available samples. If the current position is the last position in the search space to be tested (Yes in step 2060), then the template matching ends. Otherwise (No in step 2060), then the next position is obtained in step 2070 and the template matching continues as described above for the new position in step 2030.

After the end of the template matching, the best matching position is identified (e.g. as stored position with the lowest cost).

In other words, this embodiment provides motion vector prediction which enables to take into account the number of accesses to the external memory and the number of samples which are necessary to be accessible for motion vector refinement of a motion vector for a coding block. This is achieved by replacing the values which are located outside a predefined memory access window for the purpose of motion vector refinement and/or fractional interpolation with replacement values based on one or more samples from within the memory access window. According to an aspect of the disclosure, an apparatus is provided for determination of a motion vector for a prediction block including a processing circuitry configured to: obtain an initial motion vector and a template for the prediction block; determine a refinement of the initial motion vector by template matching with the template in a search space. The search space is located on a position given by the initial motion vector. Moreover, the template matching: accesses integer sample positions within a predetermined window, the predetermined window including the search space and further integer sample positions accessible for the template matching, replaces at least one integer sample position located out of the window by a replacement value which is based on at least one sample within the window, and use the accessed integer sample position values as well as the replacement values to perform the template matching.

Such apparatus provides an advantage of limiting the number of samples which are to be available for the purpose of motion vector determination (refinement) while also avoiding additional accesses to the storage/(external) memory storing the entire reference pictures.

In one embodiment, the search space includes at least one fractional sample position with a value obtained by interpolation filtering with a filter of a predefined tap-size; and the interpolation filtering uses the accessed integer sample position values and the at least one replacement value to obtain the at least one fractional sample position value.

For instance, the replacement value is determined by mirroring with respect to the axis of the interpolation filter the value of the corresponding assessed integer sample position. The interpolation filtering may be a one-dimensional or separable two-dimensional filtering.

In one exemplary implementation, the window is formed by all integer sample positions accessible for the template matching on integer sample positions within the search space.

The window is defined, for instance, by its vertical and/or horizontal size with respect to the search space, or a block with a size of the prediction block located on the initial motion vector position, or the initial motion vector position.

As another example, the replacement value is determined to be equal to the value of a closest of the accessed integer sample positions.

According to another aspect of the disclosure, an encoding apparatus is provided for encoding video images split to prediction blocks into a bitstream, the encoding apparatus comprising: the apparatus for determination of a motion vector for a prediction block as described above; and an encoding circuitry for encoding difference between the prediction block and the predictor given by a prediction block in a position based on the determined motion vector and for generating bitstream including the encoded difference and the initial motion vector.

According to another aspect of the disclosure, a decoding apparatus is provided for decoding from a bitstream video images split to prediction blocks, the decoding apparatus comprising: a parsing unit for parsing from the bitstream an initial motion vector and an encoded difference between a prediction block and a predictor given by a prediction block in a position specified by a refined motion vector; the apparatus for determination of the refined motion vector for the prediction block as described above; and decoding circuitry for reconstructing the prediction block as a sum of the parsed difference and the predictor given by the prediction block in the position specified by the refined motion vector.

According to an aspect of the disclosure, a method is provided for determination of a motion vector for a prediction block including the steps of: obtaining an initial motion vector and a template for the prediction block; and determining a refinement of the initial motion vector by template matching with the template in a search space. The search space is located on a position given by the initial motion vector. The template matching accesses integer sample positions within a predetermined window, the predetermined window including the search space and further integer sample positions accessible for the template matching; replaces at least one integer sample position located out of the window by a replacement value which is based on at least one sample within the window; and uses the accessed integer sample position values as well as the replacement values to perform the template matching.

In one embodiment, the search space includes at least one fractional sample position with a value obtained by interpolation filtering with a filter of a predefined tap-size; and the interpolation filtering uses the accessed integer sample position values and the at least one replacement value to obtain the at least one fractional sample position value.

For example, the replacement value is determined by mirroring with respect to the axis of the interpolation filter the value of the corresponding assessed integer sample position. Moreover, in one example, the interpolation filtering is a one-dimensional or separable two-dimensional filtering.

The window is formed, for instance, by all integer sample positions accessible for the template matching on integer sample positions within the search space.

According to an exemplary implementation, the window is defined by its vertical and/or horizontal size with respect to the search space, or a block with a size of the prediction block located on the initial motion vector position, or the initial motion vector position.

According to another example, the replacement value is determined to be equal to the value on a closest of the accessed integer sample positions.

Moreover an encoding method is provided for encoding video images split to prediction blocks into a bitstream, the encoding method comprising the steps of determining a motion vector for a prediction block according to any of methods described above; as well as encoding difference between the prediction block and the predictor based on a prediction block in a position based on the determined motion vector and for generating bitstream including the encoded difference and the initial motion vector.

The encoding method may further include steps described with reference to functions of blocks in FIG. 1.

Still further, a decoding method is provided for decoding from a bitstream video images split to prediction blocks, the decoding method comprising: parsing from the bitstream an initial motion vector and an encoded difference between a prediction block and a predictor given by a prediction block in a position specified by a refined motion vector; determining the refined motion vector for the prediction block according to any of methods mentioned above; and reconstructing the prediction block as a function (such as a sum) of the parsed difference and the predictor given by the prediction block in the position specified by the refined motion vector.

The decoding method may further include steps described with reference to functions of blocks in FIG. 2.

However, it is noted that FIGS. 1 and 2 are not to limit the present disclosure. They merely provide a non-limiting example of an implementation of present disclosure within the existing encoder and/or decoder.

The motion vector determination with initial motion vector rounding as described above can be implemented as a part of encoding and/or decoding of a video signal (motion picture). However, the motion vector determination may also be used for other purposes in image processing such as movement detection, movement analysis, or the like without limitation to be employed for encoding/decoding.

The motion vector determination may be implemented as an apparatus. Such apparatus may be a combination of a software and hardware. For example, the motion vector determination may be performed by a chip such as a general purpose processor, or a digital signal processor (DSP), or a field programmable gate array (FPGA), or the like. However, the present disclosure is not limited to implementation on a programmable hardware. It may be implemented on an application-specific integrated circuit (ASIC) or by a combination of the above mentioned hardware components.

The motion vector determination may also be implemented by program instructions stored on a computer readable medium. The program, when executed, causes the computer to perform the steps of the above described methods. The computer readable medium can be any medium on which the program is stored such as a DVD, CD, USB (flash) drive, hard disc, server storage available via a network, etc.

The encoder and/or decoder may be implemented in various devices including a TV set, set top box, PC, tablet, smartphone, or the like, i.e. any recording, coding, transcoding, decoding or playback device. It may be a software or an app implementing the method steps and stored/run on a processor included in an electronic device as those mentioned above.

The present disclosure relates to motion vector determination employing template matching. At first, an initial motion vector is obtained. If the initial motion vector points to a position, which is fractional and thus, requires interpolation from the integer sample positions, the initial motion vector is rounded to a closest integer sample position. The rounded position is then used to define the search space for the template matching to define a refinement of the initial motion vector.

What is claims is:
1. An apparatus, the apparatus comprising a processing circuitry configured to:
  obtain an initial motion vector and a template for a prediction block;
  based on a determination that the initial motion vector points to a fractional sample position in a reference picture, round the initial motion vector to a closest integer sample position of a plurality of integer sample positions to obtain a rounded position;
  determining a search space in the reference picture based on the rounded position; and
  refine the initial motion vector by template matching with the template in the search space,
  wherein the search space is located on a position comprising the rounded position and at least one integer sample position of the plurality of integer sample positions.

2. The apparatus according to claim 1, wherein the processing circuitry is further configured to:
  calculate a template matching cost for the initial motion vector pointing to the fractional sample position;
  compare the calculated template matching cost of the fractional sample position with a template matching cost of the refined initial motion vector; and
  determine the motion vector for the prediction block based on the fractional sample position upon a state where the template matching cost of the refined initial motion vector is not lower than the calculated template matching cost of the fractional sample position.

3. The apparatus according to claim 1, wherein the search space comprises sample positions spaced by integer sample step from each other.

4. The apparatus according to claim 1, wherein the search space is formed by K rows and L columns of samples located in rows and columns in integer distance from each other, wherein the rounded position is one of the samples of the search space.

5. The apparatus according to claim 1, wherein the rounded position is located substantially in a center of the search space.

6. The apparatus according to claim 1, wherein the template matching with the template in the search space comprises the processing circuitry configured to:
  determine an integer search space comprising sample positions spaced by integer sample step from each other;
  perform the template matching with the template in the integer search space to obtain a best matching integer position;
  based on the best matching integer position, determine a fractional search space with at least one sample spaced by less than integer sample step from a closest sample position of the sample positions of the integer search space; and
  perform the template matching with the template in the fractional search space to obtain a best matching position.

7. The apparatus according to claim 1, wherein the rounding is obtained as an integer sample position of the plurality of integer sample positions that is the closest to the fractional sample position to which the initial motion vector points.

8. The apparatus according to claim 7, wherein, based on that there are more than one integer sample position that are equally close to the fractional sample position, the rounding is obtained as an integer sample position in a predefined direction, the predefined direction being left, right, top, or bottom.

9. The apparatus according to claim 7, wherein, based on that there are more than one integer sample positions that are equally close to the fractional sample position, the search space is a unity of a search space located on the more than one integer sample positions that are equally close to the fractional sample position.

10. The apparatus according to claim 7, wherein, based on that there are more than one integer sample positions that are equally close to the fractional sample position, the rounding is obtained as the integer sample position of one or more integer sample positions that are equally close integer sample positions which results in a shorter magnitude of the rounded position.

11. The apparatus according to claim 1, wherein:
the search space is located on Hall the rounded position and comprises one or more fractional sample positions,
each of the fractional sample positions of the search space is obtained by interpolation filtering with a filter of a predefined tap-size assessing integer samples only within a window, and
the window is formed by integer samples accessible for the template matching in the search space.

12. The apparatus according to claim 1, wherein:
the search space is located on a position of the initial motion vector, and
the template matching comprises:
accessing integer sample positions within a predetermined window, the predetermined window comprising the search space and further integer sample positions being accessible for the template matching,
replacing at least one of the integer sample positions located out of the window by a replacement value that is based on at least one sample within the window, and
using the values of the accessed integer sample positions as well as of the replacements to perform the template matching.

13. A prediction block encoding apparatus for encoding a prediction block comprising:
the apparatus for determining a motion vector for the prediction block according to claim 1; and
an encoder configured to encode differences between the prediction block and a predictor obtained according to the motion vector, resulting in a bitstream.

14. A decoding apparatus for decoding the prediction block from a bitstream comprising:

a decoder configured to decode bitstream differences between the prediction block and a predictor obtained according to a motion vector;
the apparatus for determining the motion vector for the prediction block according to claim 1;
a motion predictor configured to determine the predictor according to the motion vector; and
a reconstructor configured to reconstruct the prediction block based on the predictor and the decoded differences.

15. A method for determining a motion vector for a prediction block, the method comprising:
obtaining an initial motion vector and a template for the prediction block;
based on a determination that the initial motion vector points to a fractional sample position in a reference picture, round the initial motion vector to a closest integer sample position of a plurality of integer sample positions to obtain a rounded position;
determining a search space in the reference picture based on the rounded position; and
refine the initial motion vector by template matching with the template in the search space,
wherein the search space is located on a position comprising the rounded position and at least one integer sample position of the plurality of integer sample positions.

16. A method for encoding the prediction block, the method comprising:
determining a motion vector for the prediction block according to the method of claim 15; and
encoding differences between the prediction block and a predictor obtained according to the motion vector, resulting in a bitstream.

17. A method for decoding the prediction block from a bitstream, the method comprising:
decoding bitstream differences between the prediction block and a predictor obtained according to a motion vector;
determining of the motion vector for the prediction block according to the method of claim 15;
determining the predictor according to the motion vector; and
reconstructing the prediction block based on the predictor and the decoded differences.

18. A non-transitory computer readable medium storing instructions which when executed on a processor cause the processor to perform the method according to claim 15.

* * * * *

UNITED STATES PATENT AND TRADEMARK OFFICE
CERTIFICATE OF CORRECTION

| | | |
|---|---|---|
| PATENT NO. | : 11,159,820 B2 | Page 1 of 1 |
| APPLICATION NO. | : 16/843707 | |
| DATED | : October 26, 2021 | |
| INVENTOR(S) | : Esenlik et al. | |

It is certified that error appears in the above-identified patent and that said Letters Patent is hereby corrected as shown below:

In the Claims

Claim 11: Column 39, Line 18: "the search space is located on Hall the rounded position" should read -- the search space is located on the rounded position --.

Signed and Sealed this
Fifth Day of July, 2022

Katherine Kelly Vidal
*Director of the United States Patent and Trademark Office*